US007860874B2

(12) United States Patent
Karklins et al.

(10) Patent No.: US 7,860,874 B2
(45) Date of Patent: Dec. 28, 2010

(54) METHOD FOR SEARCHING ACROSS A PLC NETWORK

(75) Inventors: Gregory Karklins, Johnson City, TN (US); James C. Rittenhouse, Gray, TN (US); James W. Cornett, Bluff City, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 390 days.

(21) Appl. No.: 11/143,695

(22) Filed: Jun. 2, 2005

(65) Prior Publication Data

US 2005/0278319 A1 Dec. 15, 2005

Related U.S. Application Data

(60) Provisional application No. 60/577,804, filed on Jun. 8, 2004, provisional application No. 60/577,943, filed on Jun. 8, 2004, provisional application No. 60/577,823, filed on Jun. 8, 2004.

(51) Int. Cl.
*G06F 17/30* (2006.01)
*G06F 15/16* (2006.01)
*G05B 15/00* (2006.01)

(52) U.S. Cl. .................. 707/758; 700/83; 709/218

(58) Field of Classification Search ............ 707/3, 707/758, 999.3; 710/100; 700/1, 83; 711/100, 711/111, 154
See application file for complete search history.

(56) References Cited

U.S. PATENT DOCUMENTS

| 4,908,746 | A | * | 3/1990 | Vaughn | 700/18 |
|---|---|---|---|---|---|
| 4,926,375 | A | * | 5/1990 | Mercer et al. | 709/201 |
| 5,127,090 | A | * | 6/1992 | Ruehle et al. | 709/246 |
| 5,131,092 | A | * | 7/1992 | Sackmann et al. | 709/207 |
| 5,230,061 | A | * | 7/1993 | Welch | 706/46 |

(Continued)

FOREIGN PATENT DOCUMENTS

CN 1206883 A 7/1998

(Continued)

OTHER PUBLICATIONS

Proctor, Frederick M., et al., "Open-Architecture Controllers", IEEE Spectrum, vol. 34, Issue 6, Jun. 1997, pp. 60-64.*
"Understanding PLC Networks", EC&M, www.ecmweb.com/mag/electric_understanding_plc_networks/index.html, Jan. 1, 1996, pp. 1-4.*
Swales, Andy, et al., "Transparent Factories Through Industrial Internets", Proc. of the 1999 IEEE Canadian Conf. on Electrical and Computer Engineering, Edmonton, Alberta, May 9-12, 1999, pp. 931-936.*
Pinceti, Paolo, "Fieldbus: More Than a Communications Link", IEEE Instrumentation & Measurement Magazine, vol. 7, Issue 1, Mar. 2004, pp. 17-23.*

(Continued)

*Primary Examiner*—Robert Stevens
(74) *Attorney, Agent, or Firm*—Jose R. de la Rosa

(57) ABSTRACT

Certain exemplary embodiments can comprise a method, comprising: recognizing, by a PLC, that a memory device has been connected to the PLC; and configuring the PLC via a PLC executable software program resident on the memory device. Certain exemplary embodiments can comprise a method, comprising: via a PLC network interface: presenting a PLC network as a namespace shell extension of an operating system of a non-PLC information device; and rendering, to a user of the non-PLC information device, the PLC network as a node of a network. Certain exemplary embodiments can comprise a method, comprising: via a PLC network interface: presenting a PLC network as a namespace shell extension of an operating system of a non-PLC information device; and searching the PLC network for at least one item corresponding to one or more search parameters.

26 Claims, 18 Drawing Sheets

U.S. PATENT DOCUMENTS

| | | | | |
|---|---|---|---|---|
| 5,287,353 | A * | 2/1994 | Buda et al. | 370/476 |
| 5,311,508 | A * | 5/1994 | Buda et al. | 370/476 |
| 5,325,522 | A * | 6/1994 | Vaughn | 707/1 |
| 5,428,555 | A * | 6/1995 | Starkey et al. | 700/275 |
| 5,485,590 | A * | 1/1996 | Hyatt et al. | 711/115 |
| 5,604,914 | A * | 2/1997 | Kabe | 710/1 |
| 5,802,321 | A * | 9/1998 | Buda et al. | 709/251 |
| 6,151,640 | A * | 11/2000 | Buda et al. | 710/11 |
| 6,205,362 | B1 * | 3/2001 | Eidson | 700/4 |
| 6,282,454 | B1 * | 8/2001 | Papadopoulos et al. | 700/83 |
| 6,321,272 | B1 * | 11/2001 | Swales | 709/250 |
| 6,327,511 | B1 * | 12/2001 | Naismith et al. | 700/19 |
| 6,334,158 | B1 * | 12/2001 | Jennyc et al. | 719/328 |
| 6,446,202 | B1 * | 9/2002 | Krivoshein et al. | 713/1 |
| 6,449,715 | B1 * | 9/2002 | Krivoshein | 713/1 |
| 6,574,743 | B1 * | 6/2003 | Boggs et al. | 713/502 |
| 6,594,529 | B1 * | 7/2003 | Boggs et al. | 700/12 |
| 6,745,254 | B2 * | 6/2004 | Boggs et al. | 710/11 |
| 6,760,782 | B1 * | 7/2004 | Swales | 709/250 |
| 6,845,401 | B1 * | 1/2005 | Papadopoulos et al. | 709/250 |
| 6,853,867 | B1 * | 2/2005 | Klindt et al. | 700/83 |
| 6,904,471 | B2 * | 6/2005 | Boggs et al. | 710/8 |
| 6,934,668 | B2 * | 8/2005 | Kodosky et al. | 703/2 |
| 6,961,686 | B2 * | 11/2005 | Kodosky et al. | 703/2 |
| 7,023,795 | B1 * | 4/2006 | Hwu | 370/219 |
| 7,024,666 | B1 * | 4/2006 | Brown | 717/137 |
| 7,032,029 | B1 * | 4/2006 | Tanzman et al. | 709/245 |
| 7,035,898 | B1 * | 4/2006 | Baker | 709/203 |
| 7,050,859 | B1 * | 5/2006 | Govindaraj et al. | 700/1 |
| 7,058,693 | B1 * | 6/2006 | Baker, Jr. | 709/217 |
| 7,062,335 | B2 * | 6/2006 | Klindt et al. | 700/83 |
| 7,086,009 | B2 * | 8/2006 | Resnick et al. | 715/771 |
| 7,086,036 | B2 * | 8/2006 | Boggs et al. | 717/128 |
| 7,146,408 | B1 * | 12/2006 | Crater et al. | 709/219 |
| 7,151,966 | B1 * | 12/2006 | Baier et al. | 700/19 |
| 7,159,007 | B2 * | 1/2007 | Stawikowski | 709/202 |
| 7,308,473 | B1 * | 12/2007 | Thomas et al. | 709/203 |
| 7,313,609 | B1 * | 12/2007 | Wischinski | 709/222 |
| 7,392,100 | B1 * | 6/2008 | Thomas et al. | 700/83 |
| 7,496,911 | B2 * | 2/2009 | Rowley et al. | 717/174 |
| 7,519,737 | B2 * | 4/2009 | Naismith et al. | 709/245 |
| 7,599,999 | B1 * | 10/2009 | Armstrong et al. | 709/216 |
| 7,606,890 | B1 * | 10/2009 | Baier et al. | 709/224 |
| 7,734,287 | B2 * | 6/2010 | Ying | 455/423 |
| 2001/0003804 | A1 | 6/2001 | Papadopoulos et al. | 700/83 |
| 2001/0039649 | A1 * | 11/2001 | Boggs et al. | 717/4 |
| 2001/0054174 | A1 * | 12/2001 | Boggs et al. | 717/4 |
| 2002/0013935 | A1 * | 1/2002 | Boggs et al. | 717/4 |
| 2002/0046221 | A1 * | 4/2002 | Wallace et al. | 707/513 |
| 2002/0120921 | A1 * | 8/2002 | Coburn et al. | 717/140 |
| 2002/0174178 | A1 * | 11/2002 | Stawikowski | 709/203 |
| 2002/0181405 | A1 * | 12/2002 | Ying | 370/245 |
| 2002/0186302 | A1 * | 12/2002 | Pulkinnen | 348/207.99 |
| 2003/0009250 | A1 * | 1/2003 | Resnick et al. | 700/94 |
| 2003/0009754 | A1 * | 1/2003 | Rowley et al. | 717/177 |
| 2003/0014322 | A1 * | 1/2003 | Kreidler et al. | 705/26 |
| 2003/0061311 | A1 * | 3/2003 | Lo | 709/220 |
| 2003/0061349 | A1 * | 3/2003 | Lo et al. | 709/225 |
| 2003/0084324 | A1 * | 5/2003 | Koved et al. | 713/200 |
| 2003/0139821 | A1 * | 7/2003 | Papadopoulos et al. | 700/9 |
| 2003/0195975 | A1 * | 10/2003 | Papadopoulos et al. | 709/230 |
| 2003/0236772 | A1 * | 12/2003 | Makris et al. | 707/3 |
| 2004/0030741 | A1 * | 2/2004 | Wolton et al. | 709/202 |
| 2004/0039468 | A1 * | 2/2004 | Zahorack et al. | 700/97 |
| 2004/0117624 | A1 * | 6/2004 | Brandt et al. | 713/166 |
| 2004/0210629 | A1 * | 10/2004 | Klindt et al. | 709/202 |
| 2004/0260404 | A1 * | 12/2004 | Russell et al. | 700/1 |
| 2005/0021839 | A1 * | 1/2005 | Russell et al. | 709/238 |
| 2006/0041521 | A1 * | 2/2006 | Oral et al. | 707/1 |
| 2006/0195465 | A1 * | 8/2006 | Atchison et al. | 707/102 |

FOREIGN PATENT DOCUMENTS

| | | |
|---|---|---|
| CN | 1499407 A | 11/2002 |
| WO | WO96/21178 | 7/1995 |
| WO | WO 96/21181 A1 * | 7/1996 |
| WO | WO/0045341 | 1/2000 |

OTHER PUBLICATIONS

Gee, Dave, "The How's and Why's of PC Based Control", PAPCON 2001, Portland, OR, Jun. 18-22, 2001, pp. 67-74.*

Powell, James, "The Profile Concept in Fieldbus Technology", ISA 2004, © 2004, pp. 1-3.*

Roengruen, P., et al., "Design of PLC Networks Using Remote I/O Module Based on Controller Area Network", CCECE 2001, Toronto, Ontario, May 13-16, 2001, pp. 1023-1027.*

Marcos, Marga, et al., "A New Solution for Integrating Control Devices Involved in Computer Integrated Manufacturing", CONTROL '96, vol. 1, Sep. 2-5, 1996, pp. 485-490.*

Flammini, A., et al., "Sensor Integration in Industrial Environment: From Fieldbus to Web Sensors", Computer Standards & Interfaces, vol. 25, Issue 2, May 2003, pp. 183-194.*

Lingqi, Li, et al., "Integration of Fieldbus into DCS", SICE '99, Morioka, Japan, Jul. 28-30, 1999, pp. 1043-1046.*

Aizono, Takeiki, et al., "Autonomous Decentralized Software Structure for Integration of Information and Control Systems", COMPSAC '97, Washington, DC, Aug. 13-15, 1997, pp. 324-331.*

Russell, D. W., "Application of PLC's as Front-End Pre-Processors in Factory Information Systems", The International Journal of Advanced Manufacturing Technology, vol. 6, No. 4, Nov. 1991, pp. 364-377.*

Baker, Jr., Richard A., "The Web PLC is Here", MachineDesign.com, Nov. 16, 2000, downloaded from http://machinedesign.com/article/the-web-plc-is-here-1116, pp. 1-7.*

"ControlNet PLC-5 Programmable Controller", Rockwell Automation Publication 1785-6.5.22-RN2, Jul. 1999, pp. 1-8.*

Knizak, Martin, et al., "Applying Internet Management Standards to FieldBus Systems", WFCS 1997, Barcelona, Spain, Oct. 1-3, 1997, pp. 309-315.*

Erickson, Cynthia, et al., "Simulation, Animation, and Shop-Floor Control", Proc. of the 1987 Winter Simulation Conf., Atlanta, GA, Dec. 14-16, 1987, pp. 649-653.*

Kleines, H., et al., "Implementation of JFPC (Java for Process Control) Under Linux—A Mechanism to Access Industrial I/Os in a Java/Linux-Environment", 8th International Conf. on Accelerator & Large Experimental Physics Control Systems, San Jose, CA, © 2001, pp. 244-246.*

Qiang, Sheng, et al., "PLC-based Control Systems for Industrial Production of Fuel Alcohol", ICIT '02, Bangkok, Thailand, © 2002 IEEE, pp. 827-832.*

PCT International Search Report—mailed Oct. 4, 2005.

PCT Written Opinion.

2466 Siemens Engineering & Automation, Mar./Apr. 1994 No. 2, Berlin, DE, Programmers "p. 740: High Performance with a New Look", p. 7-8, Brich et al.

Wollert, J. et al.: "Automatisieren Mit Dem PC? Owas Der Personal Computer Kann Und Wo er Passen Muss"; Elektronik, Weka Fachzeitscr-Verlag, Munchen, DE; vol. 43, No. 6; Mar. 1994, p. 76-82.

Dino Esposito: Shell Support for DHTML Online!: Feb. 1998, XP002345699, retrieved from Internet; Sep. 2005.

* cited by examiner

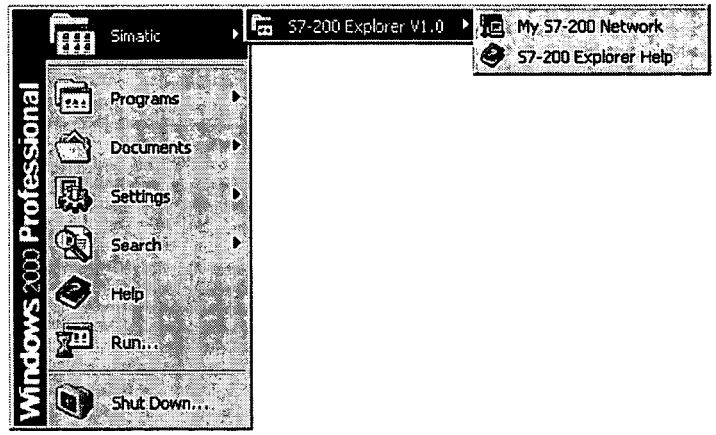
FIG. 6
| Desktop Shortcut | Launch Behavior |
|---|---|
| My S7-200 Network V1.0 | This shortcut can be used to launch the My S7-200 Network namespace in its own Windows Explorer view. |
| S7-200 Explorer V1.0 Help | This shortcut can be used to launch the help for S7-200 Explorer. |
FIG. 7
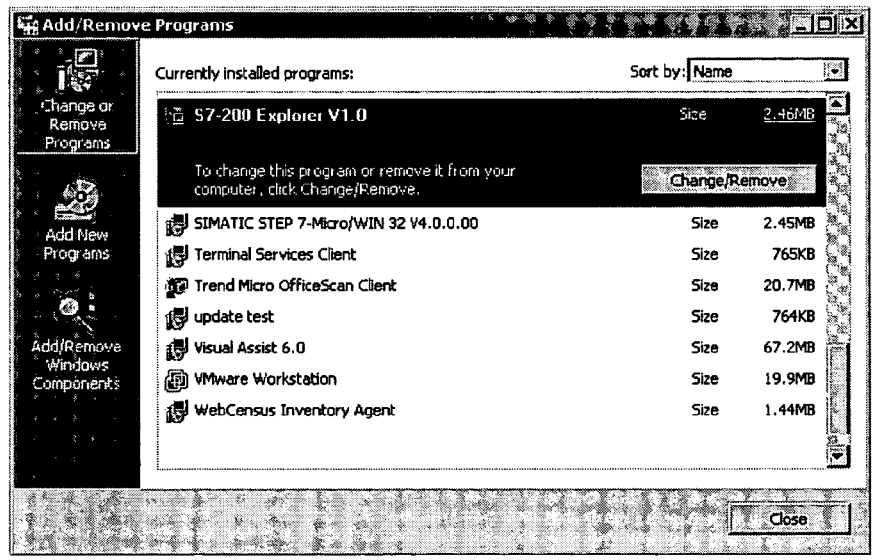
FIG. 8.

| | |
|---|---|
|  | CPU 226<br>CPU 226XM<br>(This icon can also be used for any unrecognized PLC type) |
|  | CPU 224<br>CPU 224XP |
|  | CPU 222, CPU 221 |
|  | All CPU 21x devices |
|  | Unknown Device (Does not support reading of SD memory which identifies the devices in S7-200) |
|  | TD 200 Release 2.0+ |
|  | Error reading configured Internet device. |

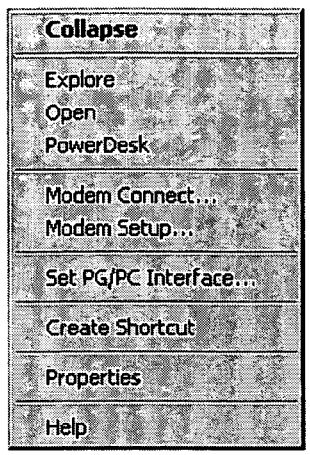 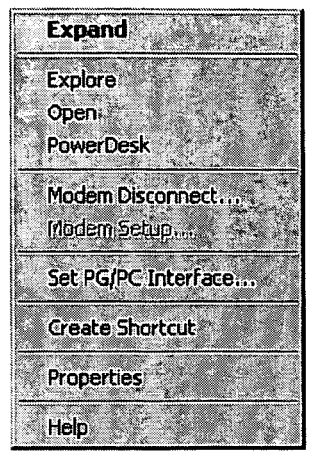
FIG. 30    FIG. 31
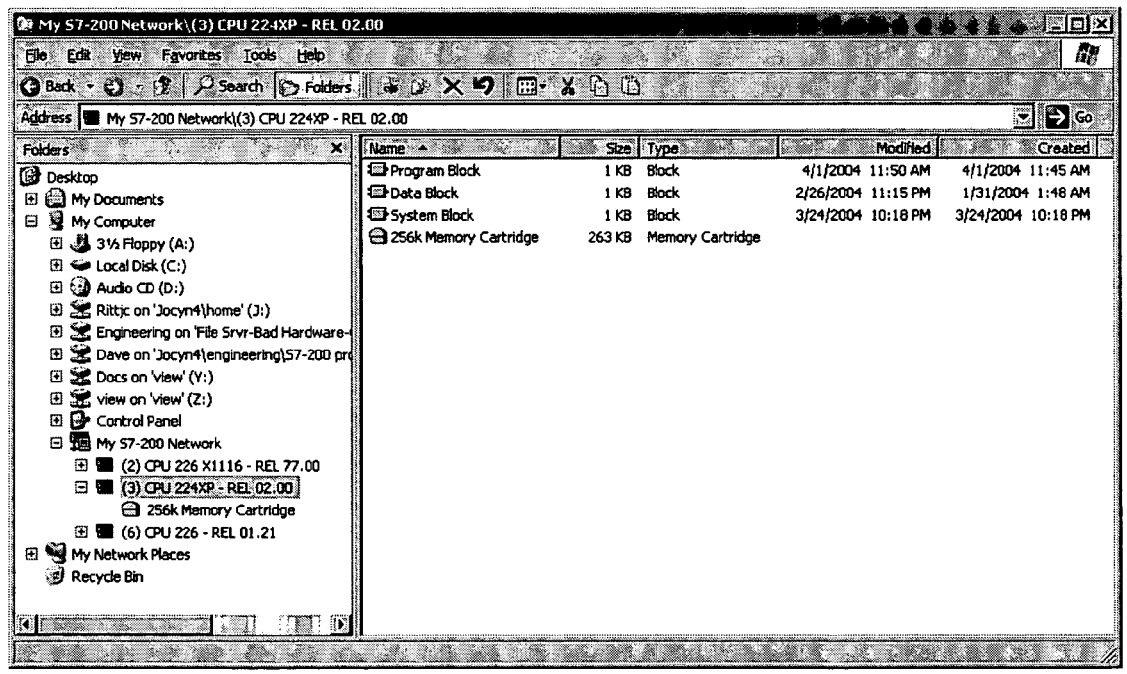
FIG. 32

METHOD FOR SEARCHING ACROSS A PLC NETWORK

CROSS-REFERENCES TO RELATED APPLICATIONS

This application claims priority to, and incorporates by reference herein in its entirety, the following pending United States Provisional Patent Applications:
 Ser. No. 60/577,804, filed 8 Jun. 2004;
 Ser. No. 60/577,943, filed 8 Jun. 2004; and
 Ser. No. 60/577,823, filed 8 Jun. 2004.

BACKGROUND

PLC configurations are frequently stored on a CPU, rather than the device that is being configured. As a result, when a device is moved, it can be necessary to reconfigure the device on the new CPU. This can be a timely, costly process and/or specialized expertise may be needed when reconfiguring the device for use on the new CPU. Thus, portable PLC configurations that enable efficient movement of devices with their corresponding configuration between PLCs can be desirable. When a PLC device is moved between PLC systems, or moved within the same PLC system, reconfiguration can be necessary in order for the device to operate in the same manner as before.

Documentation for a PLC control process can be vital for operation and maintenance of the PLC system. In order to accurately and safely maintain a PLC-based control system, a great deal of information can be required that is independent from the actual operating PLC program.

Many forms of documentation might exist that can aid in the operation and maintenance of a PLC-based control system. These might include PLC control project source files, engineering documentation, wiring diagrams, CAD drawings, etc. However, conventional PLC systems do not typically have the ability to store these files. As a result, the files can be unavailable for maintenance, for portability to upgraded systems, and/or to expand an existing or new PLC system. Accordingly, documentation often must be separately provided for each PLC of a conventional PLC network by maintenance and/or engineering personnel. This conventional system and method of file management of documentation on a PLC can be timely and/or costly.

In conventional systems, it can be necessary to develop specialized software to connect and communicate with a PLC network. Specialized dialogs and/or windows might need to be created to view information about attached PLCs and the information provided can be very limited. Often, it is not possible to utilize standard filed management and browser systems such as Explorer by Microsoft.

Therefore, it can be desirable to enable easeful and fast browsing of a PLC network and/or to provide significant, helpful information about each PLC as a user is browsing the PLC network. Also, it can be desirable to quickly determine the contents of a PLC network and/or the status of the various PLCs attached in a network.

SUMMARY

Certain exemplary embodiments can comprise systems, interfaces, machine-readable mediums, and/or methods for automatically:
 configuring a PLC based on an executable software program resident on a memory device coupled to the PLC;
 presenting, to a user of a non-PLC information device, a PLC network as network node and/or a PLC (and/or a memory device coupled to a PLC, etc.), as a component of a network node;
 enabling a user of a non-PLC information device to browse a PLC network, a PLC, and/or a memory device coupled to a PLC, etc.; and/or
 enabling a user of a non-PLC information device to search a PLC network, PLC, and/or a memory device coupled to a PLC, etc., for at least one item corresponding to one or more search parameters.

BRIEF DESCRIPTION OF THE DRAWINGS

A wide variety of potential embodiments will be more readily understood through the following detailed description of certain exemplary embodiments, with reference to the accompanying exemplary drawings in which:
FIGS. 6 through 35 are screen shots of exemplary embodiments of the S7-200 Explorer.

DEFINITIONS

Figure 1:
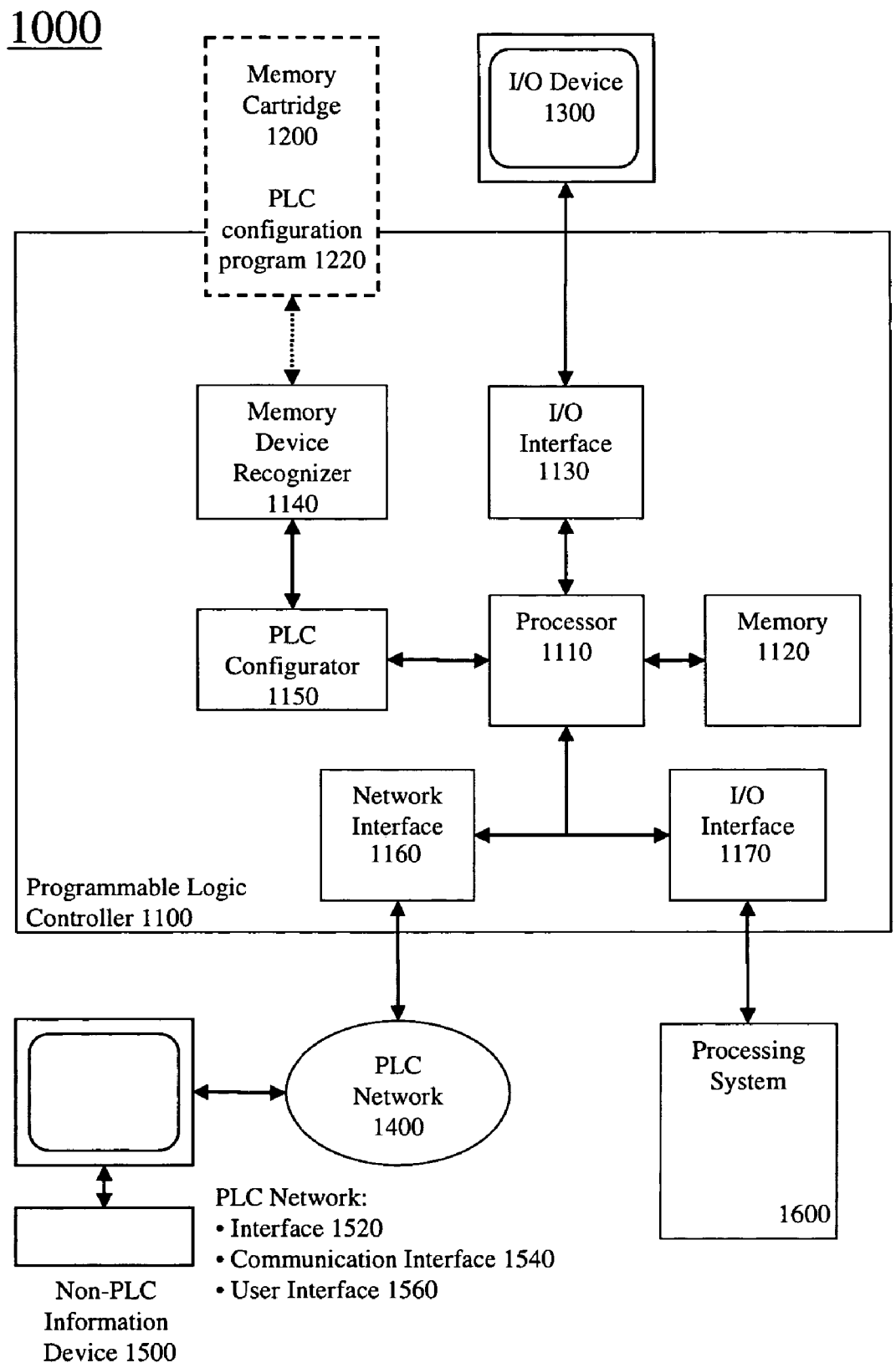
FIG. 1 is a block diagram of an exemplary embodiment of a system 1000.

When the following terms are used substantively herein, the accompanying definitions apply:
 a—at least one.
 access—to approach, enter, exit, communicate with, and/or make use of.
 activity—an action, act, step, and/or process or portion thereof.
 adapted to—made suitable or fit for a specific use or situation.
 address—a code that identifies where a piece of information is stored and/or where a node is located.
 allow—to permit and/or let happen.
 animation—humanly visible and varying graphics.
 apparatus—an appliance or device for a particular purpose
 audio—humanly audible and varying sounds.
 automatically—acting or operating in a manner essentially independent of external influence or control. For example, an automatic light switch can turn on upon "seeing" a person in its view, without the person manually operating the light switch.
 block item—a logically-separate data package, such as, for example, a program block, user block, and/or system block, etc.
 browse—to look around casually, randomly, and/or purposefully.
 can—is capable of, in at least some embodiments.
 command—a signal that initiates an operation defined by an instruction.
 communication parameter—a variable related to communicating via a network.
 comprising—including but not limited to.
 configure—to design, arrange, set up, and/or shape for a specific purpose.
 connected—physically and/or logically linked.

content—the subject matter of a written work and/or electronic file.
data—distinct pieces of information, usually formatted in a special or predetermined way and/or organized to express concepts.
data block—a portion of a memory dedicated to storing one or more sets of data.
data log—a record of data events.
define—to establish the outline, form, or structure of.
determine—ascertain, obtain, and/or calculate.
EEPROM (Electrically Erasable Programmable Read-Only Memory)—a non-volatile storage device using a technique similar to the floating gates in EPROMs but with the capability to discharge the floating gate electrically.
electronic file—a collection of related data or program records stored in a memory as a unit with a single name.
Ethernet—a frame-based computer networking technology for local area networks (LANs). It defines wiring and signaling for the physical layer, and frame formats and protocols for the media access control (MAC)/data link layer of the OSI model.
executable—able to run.
execute—run.
file creation—a date on which an electronic file was generated.
file name—a computer-readable and/or user readable identifier for an electronic file.
file type—an indicator of an application program used to create and/or open an electronic file.
firmware—a program that is stored in non-volatile memory built from integrated circuits.
folder—a collection of computer files; a directory of computer files; an icon in a graphic user interface that represents a collection of items, such as computer files.
graphical—a pictorial representation.
hierarchical structure—a visible classification scheme that accords with various criteria, the scheme having successive levels or layers.
highlight—to identify, illuminate, and/or draw attention to.
icon—in a graphical user interface (GUI), a pictorial, on-screen representation of an object, such as a file, program, folder, or disk drive.
identify—to name; to establish the identity and/or existence of.
image—a representation of a photograph and/or other picture.
information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or graphical user interface described herein may be used as an information device. An information device can comprise well-known components such as one or more network interfaces, one or more processors, one or more memories containing instructions, and/or one or more input/output (I/O) devices, one or more user interfaces coupled to an I/O device, etc.
input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.
instance—an occurrence of something, such as an actual usage of an individual object of a certain class. Each instance of a class can have different values for its instance variables, i.e., its state.
instructions—directions adapted to perform a particular operation or function.
item—a computer file, folder, volume, disk, and/or node.
machine readable medium—a physical structure from which a machine can obtain data and/or information. Examples include a memory, punch cards, etc.
manage—to direct or control the use of; handle.
may—is allowed to, in at least some embodiments.
memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.
method—a process, procedure, and/or collection of related activities for accomplishing something.
modification—a change to a content of an electronic file.
namespace shell extension—a mechanism for adding customized funtionality to an operating system in such a manner that the custom functionality appears to the user to be a substantially seamless part of the operating system.
network—a communicatively coupled plurality of nodes.
network interface—any device, system, subsystem, and/or software capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device and/or software to manage such a device.
node—an information device coupled to a network.
non-PLC information device—an information device that is not a PLC.
operating system—Low-level software that handles the interface to peripheral hardware, schedules tasks, allocates storage, and presents a default interface to the user when no application program is running. The operating system can be considered as split into a kernel that is always present and various system programs that use facilities provided by the kernel to perform higher-level house-keeping tasks, often acting as servers in a clientserver relationship. The operating system can be considered as including a graphical user interface and a windowing system.

order—to arrange and/or present.

parameter—a variable.

personal computer—a general-purpose microcomputer designed to be operated by one person at a time.

PLC configuration program—a program adapted to configure a PLC.

PLC network—a network of communicatively coupled PLC's.

plurality—the state of being plural and/or more than one.

poll—to check status to see if a particular external event has occurred.

PPI (Point to Point Interface)—a peer-to-peer data communication interface used for operator interface connections for certain PLC's, such as the Siemens S7-200 family of PLC's.

predetermined—established in advance.

present—to introduce, provide, show, display and/or offer for consideration.

preview—to view or exhibit in advance; an introductory or preliminary message, sample, and/or overview; a foretaste.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

Profibus (Process Field Bus)—a popular, open, and vendor-independent type of fieldbus and/or token ring bus used in automation technology.

program—a set of coded instructions that enables a machine, especially a computer, to perform a desired sequence of operations.

program block—a portion of a memory dedicated to storing one or more programs.

programmable logic controller (PLC)—a device that follows programmed instructions to evaluate a set of inputs and provide automated monitoring and/or control of an industrial plant and/or process. A PLC can be applied in uses comprising materials conveying, materials pumping, materials manufacturing, electrical power generation, electrical power distribution, heating systems, ventilating systems, air conditioning systems, chemical processing, mining, machining, packaging, and/or materials distribution, etc. A PLC can be communicatively coupled with a first network of non-information devices such as sensors and/or actuators. A PLC can be communicatively coupled with a second network of information devices.

property—a parameter of an electronic file.

provide—to furnish, supply, and/or make available.

read—to obtain.

receive—to take, get, acquire, and/or have bestowed upon.

recipe—a plurality of input values and/or settings, each corresponding to a process variable, and communicable to a PLC program for operating a process.

recognize—to perceive or show acceptance of the validity of.

render—to make perceptible.

resident—located and/or present.

running—in operation.

search—to investigate, examine, and/or probe.

search parameter—a criteria to which a search is constrained.

select—to choose.

set—a related plurality.

size—an amount of physical and/or virtual memory occupied by an electronic file.

software—a written program that is stored in volatile memory.

specify—to state explicitly and/or in detail.

storage location—a physical and/or virtual place of an electronic file.

store—to place, hold, and/or retain data, typically in a memory.

stored on PLC network—stored on a node and/or a memory device coupled to a node, of a PLC network.

substantially—to a great extent or degree.

system—a collection of mechanisms, devices, data, and/or instructions, the collection designed to perform one or more specific functions.

system block—a portion of a memory dedicated to storing one or more operating system programs.

temporal—regarding a creation and/or modification date and/or time.

textual—words treated as data by a computer.

user—a person interfacing with an information device.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

user log—a record of events associated with one or more users.

video—humanly visible and varying images.

volume—a disk drive and/or virtual disk drive.

Windows family—any operating system having "Windows" in its name and provided by Microsoft Corporation of Redmond, Wash.

DETAILED DESCRIPTION

Certain exemplary embodiments can comprise a method, comprising: recognizing, by a PLC, that a memory device has been connected to the PLC; and configuring the PLC via a PLC executable software program resident on the memory device. Certain exemplary embodiments can comprise a method, comprising: via a PLC network interface: presenting a PLC network as a namespace shell extension of an operating system of a non-PLC information device; and rendering, to a user of the non-PLC information device, the PLC network as a node of a network. Certain exemplary embodiments can comprise a method, comprising: via a PLC network interface: presenting a PLC network as a namespace shell extension of an operating system of a non-PLC information device; and searching the PLC network for at least one item corresponding to one or more search parameters.

Programmable logic controllers (PLCs) have traditionally been utilized in a wide spectrum of applications from factory automation to waste water treatment plant controls and from chemical process plant control to engine management systems. Each application typically has a unique program, written to the user's specifications, to control the sequence of events for that particular system.

Today, many industries use programmable logic controllers to properly operate and monitor elaborate industrial equipment and processes. Programmable logic controllers typically operate in accordance with a stored control program that causes the controller to examine the state of the controlled machinery and/or process by evaluating signals from one or more sensing devices (e.g., temperature or pressure sensors), and to operate the machinery and/or process elements (e.g., by energizing or de-energizing operative components) based on a procedural framework, the sensor signals and, if necessary, more complex processing.

Information can be gathered by the PLC from various sensor inputs (analog and/or discrete). The PLC can process the data using, for example, Relay Ladder Logic, a type of computer program based on Hard Wired Relay Logic. As sensor data is gathered and manipulated by the user program, the PLC can send appropriate output signals to control the operation of the equipment to which it is connected. The result is often safer, more efficient operation of the monitored or controlled equipment.

Frequently, process operation is monitored, at least intermittently, by supervisory personnel by means of one or more central management stations. Each station can sample the status of controllers (and their associated sensors) selected by the operator and/or can present the data in some meaningful format. The management station may or may not be located on the same site as the monitored equipment; frequently, one central station can have access to multiple sites (whether or not these perform related processes).

A programmable logic controller (PLC) can utilize a portable memory device for storage. The memory device, which can be a memory cartridge, can be an electronically erasable programmable read only memory (EEPROM) device. The memory device can be used to store one or more PLC executable software programs, recipes, data logs, process documentation, program documentation, user files, etc. Each of these items can be stored on the memory device as a discrete binary or text file.

The memory device can also comprise dedicated memory blocks such as a program block, a data block, and/or a system block. Each of these blocks can be available to the PLC for temporary storage prior to and/or during execution of the PLC executable software program.

Upon connection of the memory device to the PLC, the memory device can be automatically read to detect the PLC executable software program, and can automatically execute that program to configure the PLC.

The PLC can include a network interface that allows certain remote information devices to recognize the PLC as a node of a network, such as a PLC network. The PLC and/or the remote information devices can comprise interface software that can allow the remote information devices to interpret the PLC network, PLC, memory cartridge, file structure of the memory cartridge, and/or files themselves, in a manner consistent with the operating system of the remote information device.

Thus, for example, a remote information device can run the Windows XP operating system, and can interpret and/or render the PLC, memory device, and/or contents of the memory device as a network node, device, volume, folder, file, and/or item in a hierarchical path. As another example, a memory cartridge can appear in Windows Explorer (or any other path-rendering human interface) as an item of a hierarchical path comprising the PLC network, the PLC, the memory cartridge, and/or the memory cartridge contents (which can be rendered and/or treated as files).

The PLC interface software residing on the information device can allow a user to treat files residing on the memory device in the same manner as files residing on and/or in any other recognizable node, device, volume, folder, etc. Thus, the user can copy files to and/or from the memory device, delete files from the memory device, rename files on the memory device, etc.

Moreover, the PLC interface software can support multiple instances of the files, so that multiple windows can be displayed providing the same or different views of those files.

By presenting the PLC network, PLC, memory cartridge, file structure of the memory cartridge, and/or files stored on the memory cartridge in a manner recognizable by the operating system of the remote information device, the PLC interface software can allow a user, via the capabilities built-in to the operating system of the remote information device, to perform a search for files residing on and/or in the PLC network, PLC, memory cartridge, etc. Thus, for example, a user can search for any file that, for example, has "flowchart" in its name, has a ".pdf" extension, was created before 20 Jan. 2005, was modified after 24 Jan. 2005, has a particular icon associated therewith, etc. The search can return a list of files that conform to the search criteria.

Moreover, utilizing the search capabilities of the operating system and/or other software loaded on the remote information device, the PLC interface software can allow the user to perform a search of the contents of the files residing on and/or in the PLC network, PLC, memory cartridge, etc. Thus, for example, a user can search for all mentions of the phrase "T-101 High Level Alarm" in any file located on any PLC and/or memory cartridge visible from the remote information device. The search can return a list of files that conform to the search criteria and/or highlight, preview, and/or otherwise identify the portion of the file that contains the text, graphic, photograph, audio clip, video, etc. that corresponds to the search parameters.

FIG. 1 is a block diagram of an exemplary embodiment of a system 1000, which can comprise one or more PLC's 1100. Any given PLC 1100 can comprise a processor 1100, a memory 1120, an I/O interface 1130, a memory device recognizer 1140, a PLC configurator 1150, a network interface 1160, and/or a processing system I/O interface 1170.

A memory cartridge and/or device 1200, which can store a PLC configuration program, can be inserted into, plugged into, coupled to, connected to, received by, etc., PLC 1100, where memory device 1200 can be recognized and/or read by memory device recognizer 1140. Memory device 1200 can comprise a plastic, polycarbonate, metal, aluminum, etc. housing and/or one or more EEPROMs, flash drives, and/or hard drives. Memory device 1200 can have a storage capacity ranging from approximately 8 KB to 128 GB, and possibly greater, including all values and subranges therebetween. Memory device 1200 can have a data transfer rate of from approximately 8 KB/sec to approximately 128 MB/sec, and possibly greater, including all values and subranges therebetween. Memory device 1200 can be small, lightweight, compact, portable, removable, hot-swappable, high-speed, and/or plug-and-play. Memory device 1200 can conform to the CompactFlash, SD, Mini SD, MultiMediaCard (MMC), RS-MMC, MemoryStick, MemoryStick PRO, MemoryStick DUO, MemoryStick PRO DUO, Smart Media, XD, USB, USB 2.0, Firewire, Firewire 800, and/or SCSI, etc. formats. Memory device 1200 can utilize security, encryption, and/or certification software, such as AES, to safeguard any files and/or data stored thereon.

An input/output device 1300, such as a monitor, keyboard, mouse, printer, etc., can be coupled to I/O interface 1130 of PLC 1100. To processing system input/output interface 1170 can be coupled a processing system 1600, which can contain a plurality of sensors, actuators, etc. which can comprise, be comprised by, and/or be associated with machinery and/or process elements.

To network interface 1160 can be coupled a network 1400, such as a PLC network. To network 1400 can be coupled one or more non-PLC information devices 1500, which can store, utilize, and/or operate a PLC network interface 1520, PLC network communications interface 1540, and/or PLC network user interface 1560, etc.

Figure 2:
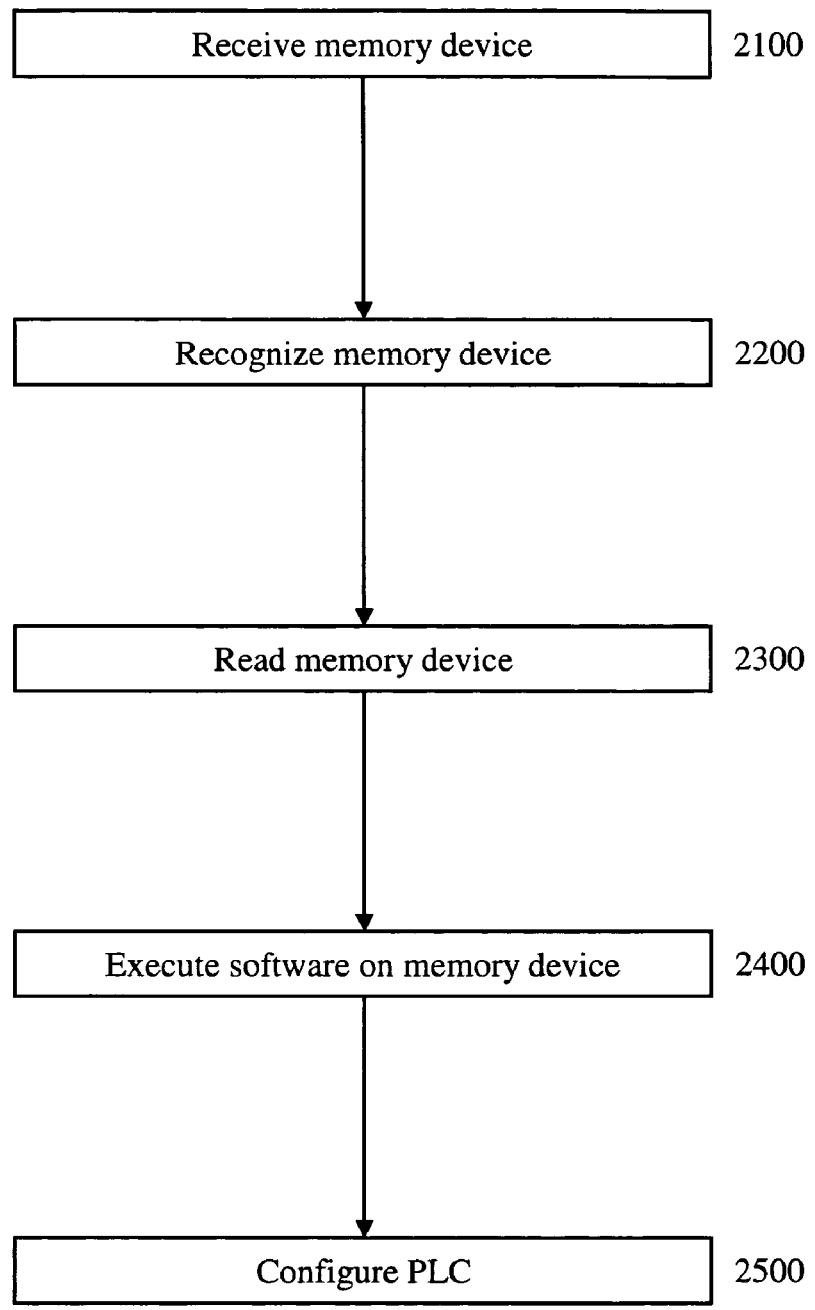
FIG. 2 is a flowchart of an exemplary embodiment of a method 2000.

FIG. 2 is a flowchart of an exemplary embodiment of a method 2000. At activity 2100, a memory cartridge and/or device can be inserted into, plugged into, coupled to, connected to, received by, etc., a PLC. At activity 2200, the PLC and/or a memory device recognizer stored on a memory of, associated with, and/or coupled to, etc., the PLC, can recognize the memory device. At activity 2300, the memory device can be read and/or a PLC configuration program stored on the memory device can be an be identified, recognized, and/or selected from among a plurality of PLC executable software programs resident on the memory device. At activity 2400, the PLC configuration program stored can be executed. At activity 2500, one or more parameters associated with the PLC, and/or one or more values for each of those parameters, can be identified, determined, and/or set by the PLC configuration program, and/or the PLC can be configured to conform with those values for those parameters.

Figure 3:
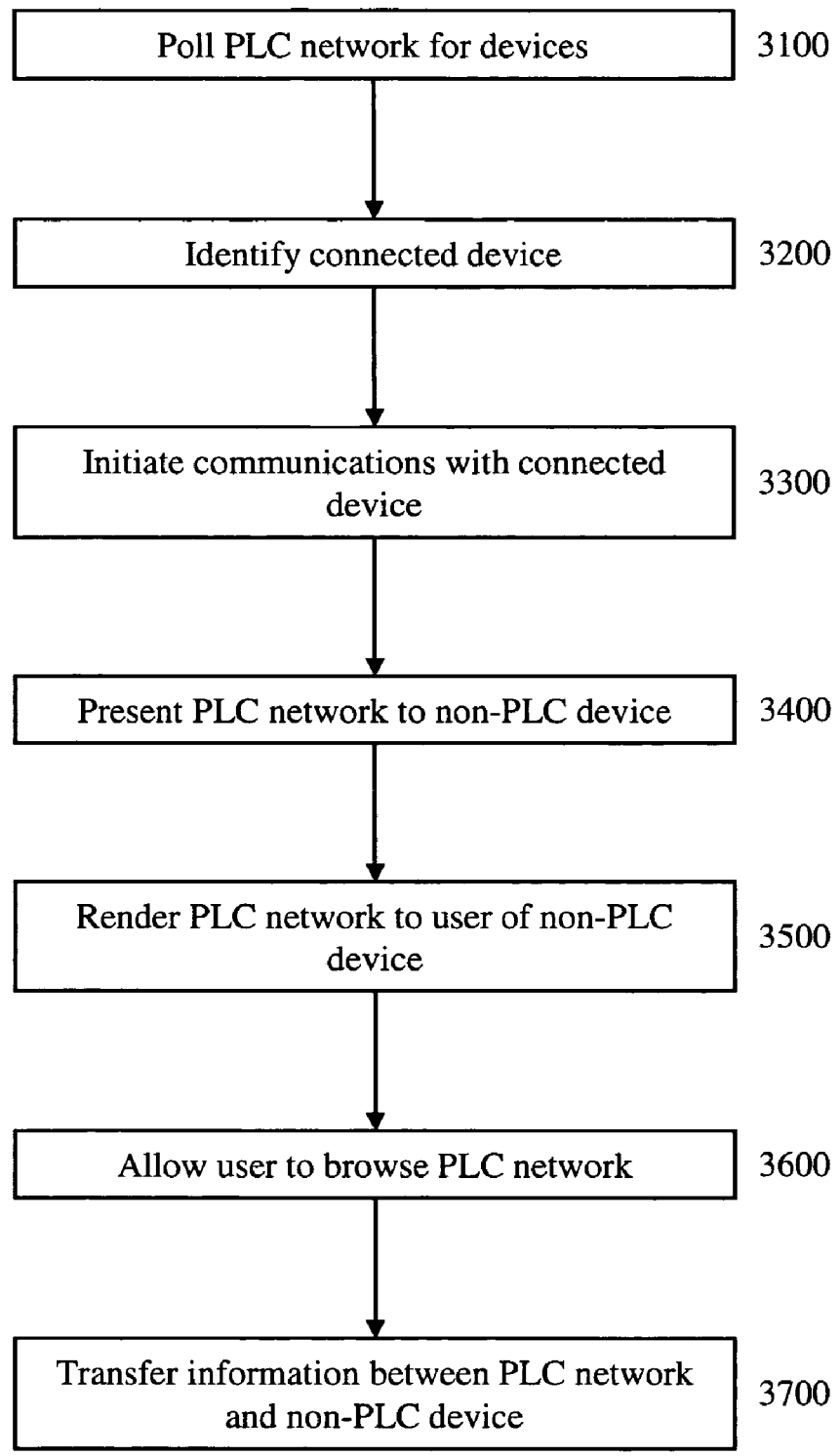
FIG. 3 is a flowchart of an exemplary embodiment of a method 3000.

FIG. 3 is a flowchart of an exemplary embodiment of a method 3000. At activity 3100, a PLC network interface associated with a non-PLC information device can poll for networks (such as one or more PLC networks) and/or devices coupled to each network, such as a PLC and/or a memory device coupled to a PLC. At activity 3200, the PLC network interface can identify one or more PLC networks, addresses of each network, and/or one or more devices coupled to each network. At activity 3300, communications parameters and/or values therefore can be exchanged between the PLC network interface and the PLC network and/or devices coupled thereto, the PLC network interface and the PLC network and/or devices coupled thereto can be communicatively coupled, and/or communications can occur between the PLC network interface and an identified PLC network and/or device coupled thereto.

At activity 3400, a PLC network can be presented to and/or interpreted by a non-PLC information device as a namespace shell extension of a running operating system of the non-PLC information device. The operating system can be a personal computer operating system, such as a member of the Windows family of operating systems (e.g., Windows 2000, Windows NT, Windows XP, etc.), the Macintosh family of operating systems (OS 9, OS X, etc.), Linux, Unix, Solaris, etc. For each recognized device coupled to the PLC network, a PLC network address can be provided to, received by, and/or determined by the PLC network interface. As needed, multiple instances of the PLC network and/or devices coupled thereto can be provided.

At activity 3500, a PLC network and/or devices coupled thereto can be rendered to a user of a non-PLC information device. For example, a PLC network can be rendered as a volume, directory, folder, and/or a predetermined icon, such as a network icon. As another example, a folder item can be rendered for each device coupled to the PLC network and/or each file stored on such a device. The folder item can be rendered as a volume, directory, folder, and/or a predetermined icon, such as a PLC and/or a PLC memory device icon. Thus, the PLC network, PLC's, PLC memory devices, and/or PLC memory device files can be rendered hierarchically, as a hierarchical structure, and/or as a path. Folder items can be rendered in any order, such as by PLC network address (e.g., Profibus, PPI, and/or Ethernet address, etc.), by item type, in alphabetical name order, in date created order, in date modified order, and/or in size order, etc.

At activity 3600, a user can be empowered and/or permitted to browse a PLC network, such as by using a file browser such as Windows Explorer and/or Macintosh Finder, etc., and/or by using an IP browser such as Internet Explorer, FireFox, and/or Safari, etc.

At activity 3700, information stored on a device coupled to a PLC network can be identified to a user of the non-PLC information device, and/or information can be transferred between a PLC network, a device coupled to a PLC network, and/or a non-PLC information device. An appropriate graphic can be rendered in response to a user of the non-PLC information device issuing a command regarding such information. For example, an icon and/or animation can be rendered indicating progress in transferring a file from (or to) a PLC memory device to (or from) the non-PLC information device.

Figure 4:
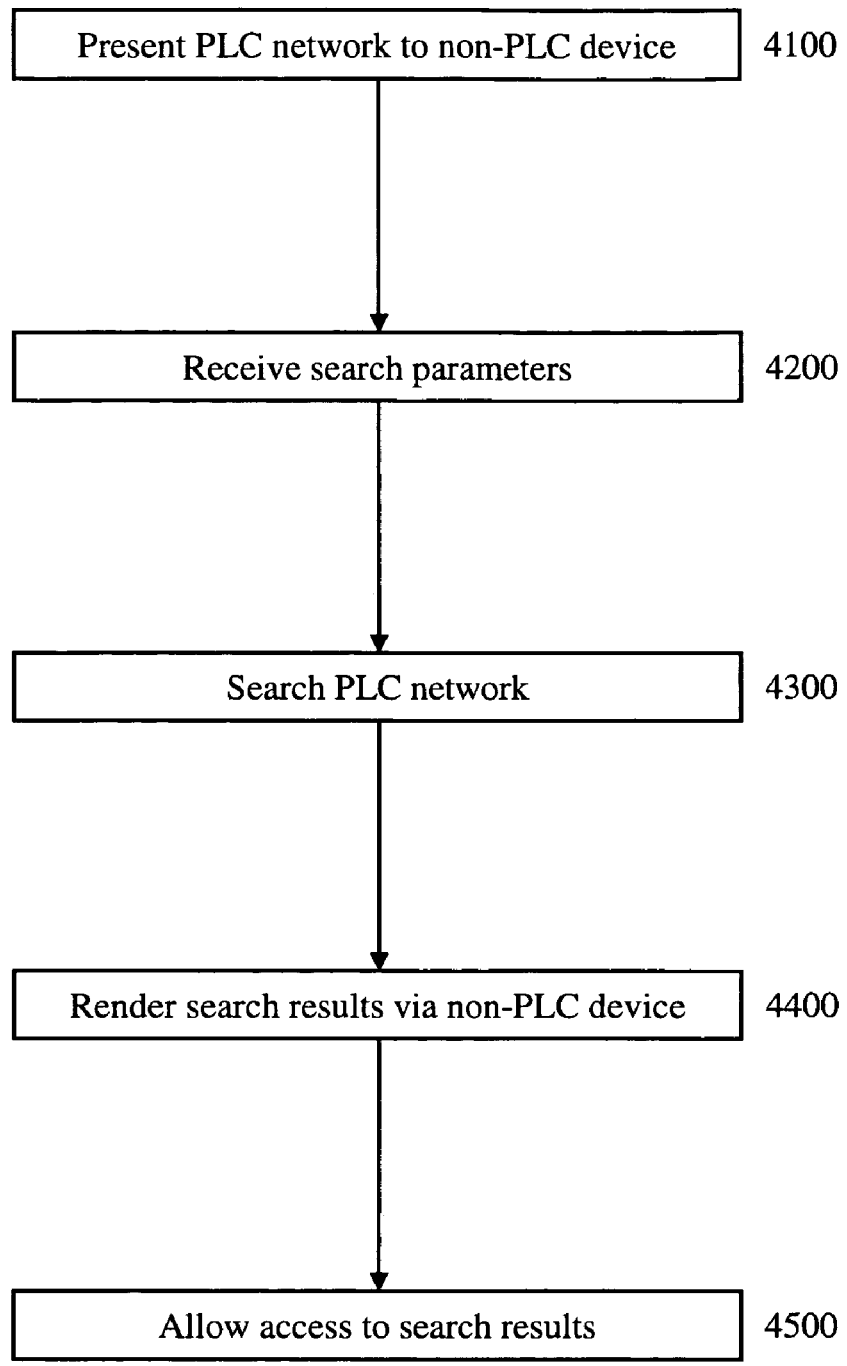
FIG. 4 is a flowchart of an exemplary embodiment of a method 4000.

FIG. 4 is a flowchart of an exemplary embodiment of a method 4000. At activity 4100, a PLC network can be presented to and/or interpreted by a non-PLC information device as a namespace shell extension of a running operating system of the non-PLC information device. For each recognized device coupled to the PLC network, a PLC network address can be provided to, received by, and/or determined by the PLC network interface. As needed, multiple instances of the PLC network and/or devices coupled thereto can be provided. A PLC network, PLC's, PLC memory devices, and/or PLC memory device files can be rendered, to a user of the non-PLC information device, in any of numerous manners, such as hierarchically, as a hierarchical structure, and/or as a path, etc.

At activity 4200, the user can enter, and/or a PLC network interface associated with a non-PLC information device can receive from the user, values for one or more search parameters of interest to the user for searching one or more items, such as one or more PLC networks, PLC's, PLC memory devices, PLC memory device files, and/or content and/or metadata thereof, etc. Any of numerous search parameters can be selectable, including, for example, a property of the item, an address of an item, any portion of an item name, an item type, item creation information, item modification information, temporal information, item storage information, item size, a textual content of an item, a graphical content of an item, an image content of an item, an audio content of an item, a video content of an item, an animation content of an item, etc. For example, a user can search for any files containing mentions of the words "asbestos", "carcinogen", "hazardous", "mercury", and/or "lead".

At activity 4300, the PLC network interface can initiate a search for and/or of one or more PLC networks, PLC's, PLC memory devices, PLC memory device files, and/or content and/or metadata thereof, etc., that corresponds, at least in part, to the provided values of the search parameters, and/or any matches can be identified and/or provided to the PLC network interface.

At activity 4400, at least a portion of the items identified by the search can be rendered to the user, such as via the PLC network interface. Any identified item can be rendered in a manner that a portion of an item that caused the item to be considered a match can be highlighted, rendered in context, and/or previewed. For example, 25 words on either side of any mentions of the search terms "asbestos", "carcinogen", "hazardous", "mercury", and "lead" can be rendered. The items of the search results can be weighted and/or ranked. The items of the search results can be rendered in any order, such as by rank, name (alphabetically), type, size, creation date, modification date, etc.

At activity 4500, the user can access one or more of the search results and/or associated information, such as via the PLC network interface. For example, by double-clicking on any item rendered as a search result, a user can be provided with additional information about that item. If the item is a file, the file can be opened, perhaps to the location at which the match occurred.

Figure 5:
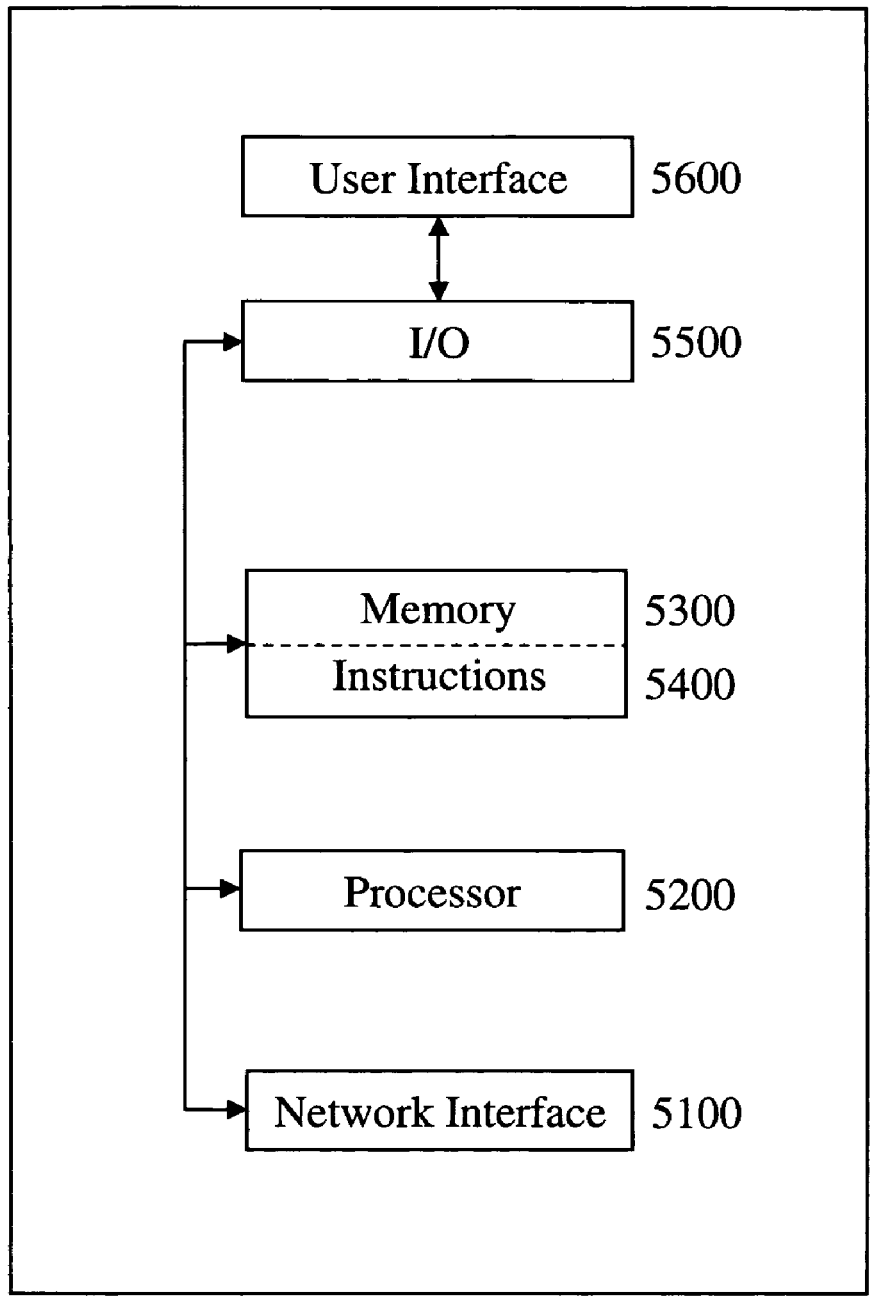
FIG. 5 is a block diagram of an exemplary embodiment of an information device 5000.

FIG. 5 is a block diagram of an exemplary embodiment of an information device 5000, which in certain operative embodiments can comprise, for example, PLC 1100 and/or non-PLC information device 1500 of FIG. 1. Information device 5000 can comprise any of numerous well-known components, such as for example, one or more network interfaces 5100, one or more processors 5200, one or more memories 5300 containing instructions 5400, one or more input/output (I/O) devices 5500, and/or one or more user interfaces 5600 coupled to I/O device 5500, etc.

In certain exemplary embodiments, via one or more user interfaces 5600, such as a graphical user interface, a user can view a rendering of information related to a PLC network and/or a PLC.

S7-200 Explorer

Certain exemplary embodiments are referred to herein as the "S7-200 Explorer", which can integrate with Microsoft Windows Explorer and/or Microsoft Internet Explorer to allow the user to browse their S7-200 network and/or the contents of each PLC on the network. The remainder of this Detailed Description describes various potential aspects of certain exemplary embodiments of S7-200 Explorer.

| Terminology used in this portion of the Detailed Description | Description |
| --- | --- |
| Access Point | A standard S7DOS term that refers to the set of communications devices and protocols available to a specific application. Each SIMATIC application generally can have a unique access point. |
| Namespace Shell Extension or NSE | A COM server that represents a hierarchical storage of objects, and can be accessed by Windows Shell clients such as Windows Explorer and Windows Internet Explorer. |
| Explore | A Windows standard term that refers to viewing namespaces and their subfolders in the "left" pane (or folder view in Window Internet Explorer) of Windows Explorer. Individual items that have no sub item representations (like a file) need not be shown in the Explore view. |
| Open | A Windows standard term that refers to viewing a folder's contents in the "right" pane of Windows Explorer. This view shows BOTH files and sub folders that can be contained in the currently "explored" item. "Open" can be effectively a "look inside" the object. |
| Context Menu | A popup menu displayed automatically in response to a right mouse button click. The contents of the menu can be context-specific to the location where the user clicked. |
| Gen 3 MC | The 256 KB & 64 KB memory cartridge available for use with S7-22X G2E PLCs. This can be the memory cartridge that can be "opened" using the S7-200 Explorer. The older memory cartridges Gen 1 (8k & 16k) and the Gen 2 (32 KB) can be detected and need not be displayed in S7-200 Explorer. |
| GPB | General Purpose Block. A block that contains memory cartridge directory information in Area 1 and user file data in Area 3. |
| UDM | Upload Download Manager. Multifaceted dialog in Microwin that manages the Programming of a memory cartridge via the PLC as well as Upload, Download, and Clear operations. |

-continued

| Terminology used in this portion of the Detailed Description | Description |
|---|---|
| Tree Node | An item listed in the tree view of the S7-200 Explorer which can have no sub items. |
| Tree Folder | An item listed in the tree view of the S7-200 Explorer which can have subitems. In the tree view, the term folder can be used to indicate an item that can be "explored" or "opened" to view its contents. |

Functional Specification

This subsection describes the potential appearance and/or functionality of certain exemplary embodiments of S7-200 Explorer.

Product Deployment

Certain exemplary embodiments of S7-200 Explorer can be available through either of two channels:

The S7-200 Explorer can ship and install as a standard addition to STEP 7-Micro/WIN Version 4.0. It can be included on the same setup CD as STEP 7-Micro/WIN, and/or can be automatically installed along with STEP 7-Micro/WIN, with no additional user interaction.

The S7-200 Explorer can also be made available as a free internet download. Users need not have to purchase STEP 7-Micro/WIN in order to obtain, install, and/or use the S7-200 Explorer. When the product is installed from an internet download, a minimal setup interface can be supplied so that the user can customize their installation.

Installation Options

When certain exemplary embodiments of S7-200 Explorer are installed from an internet download, the user can be asked to specify the following information:

Installation Directory—The user need not necessarily be provided the option to select the drive/directory where S7-200 Explorer will be installed. The default directory can be C:\Program Files\Siemens\S7-200 Explorer.

National Language—The user can have the option to select which National Language will be used for the S7-200 Explorer interface. The S7-200 Explorer can install any of the national languages supported by STEP 7-Micro/WIN. The user can be asked to choose which language they wish to use on install. The default choice for this selection can be the national language chosen for the setup.

When S7-200 Explorer can be implicitly installed as part of the STEP 7-Micro/WIN installation, the installation directory can be a peer of the directory where STEP 7-Micro/WIN was installed, and/or can be named S7-200 Explorer. The national language for S7-200 Explorer can automatically be set to the national language selected by the setup script for STEP 7-Micro/WIN.

Installation Artifacts

Installing certain exemplary embodiments of S7-200 Explorer (in either of the manners described above) can cause the following changes to the user's system:

Start Menu

The user's Start Menu can be updated to include choices for My S7-200 Network and/or S7-200 Explorer Help. These two choices can appear in the S7-200 Explorer V1.0 folder, which in turn can be placed under the SIMATIC Folder. The SIMATIC folder can act a container for SIMATIC software on the user's machine. In this regard, S7-200 Explorer can appear as a peer to any installed versions of STEP 7-Micro/WIN. FIG. 6 illustrates the Start menu for an exemplary embodiment of an independent installation of S7-200 Explorer. Note that some details of this screen capture can be specific to Windows 2000®. The Windows XP® Start menu can have a slightly different appearance.

Desktop Shortcuts

S7-200 Explorer can place two shortcuts on the user's desktop, that can match the items added to the start menu. FIG. 7 provides an illustration of exemplary embodiments of the icons for these shortcuts.

PG/PC Interface

S7-200 Explorer can install the same communication support as STEP 7-Micro/WIN, no matter which installation option is used. Further, S7-200 Explorer can use the same communications access point as STEP 7-Micro/WIN. Therefore, any change to the communications settings while working in one can affect the other.

Change/Remove Installation

S7-200 Explorer can have a separate entry in the Add/Remove Programs dialog, as illustrated in the exemplary embodiment shown in FIG. 8. Clicking the Change/Remove button can launch the Installshield® wizard for the S7-200 Explorer. From this dialog the user can have the following options:

Remove the current installation. This option can allow the user to uninstall the S7-200 Explorer.

Operating System Dependencies/Compatibility

S7-200 Explorer can install and operate on all operating systems/OS versions supported by STEP 7-Micro/WIN v4.0.

STEP 7—Micro/WIN Dependencies/Compatibility

S7-200 Explorer can install all the components necessary for its own operation. It need have no component or DLL dependency on a specific version of STEP 7-Micro/WIN. For this reason, it can be compatible with all existing versions of STEP 7-Micro/WIN.

Compatibility with Other SIMATIC Products

S7-200 Explorer need have no specific compatibility issues with other SIMATIC products. It can co-exist with other SIMATIC applications to the same degree as STEP 7-Micro/WIN v4.0.

The "My S7-200 Network" Namespace

"My S7-200 Network" can be a Windows namespace shell extension (NSE) that allows the user to explore the "contents" of their S7-200 network in the same manner they would explore their file system. The "My S7-200 Network" NSE can appear as a hierachial container that can be accessed from Windows Explorer. Examples of common namespaces used in Windows can be "Control Panel", "My Computer", "My Network Places", etc. Namespaces can contain namespaces below them as well. The ability to integrate into the Windows shell can give some unique oportunities to allow Microsystems control interfaces to have the look and feel of being a part of the Window's experience for users as well as some unique integration capabilites such as scheduling upload of Data Logs.

Accessing "My S7-200 Network"

Once the S7-200 Explorer has been installed on the user's system, the "My S7-200 Network" NSE can appear as a node under "My Computer" in Windows Explorer. Therefore, any time the user launches Windows Explorer they can have access to the "My S7-200 Network". The user can also have the ability to specifically launch the My S7-200 Network NSE through either the Start Menu or the Desktop icon. Note that in either of these cases, the Windows Explorer Shell can be launched with My S7-200 Network as the "root" node.

General Statement regarding Windows® Standard Operations

The My S7-200 Network NSE can integrate with Windows Explorer in a completely seamless manner. With this integration can come much standard behavior that need not necessarily be detailed here. As a general rule, the My S7-200 Network namespace can behave in a completely standard manner, supporting the same keyboard and mouse behavior as other Windows namespaces. This application describes some of the functionality and behavior specific to My S7-200 Network, and any instances where the standard behavior of Windows namespaces can be overridden. Where this application fails to detail specific functionality, it can be assumed to match the Windows standards.

It can also be stated that standard Windows appearances and behaviors can differ somewhat between different Windows versions. Again, this application need not attempt to detail the differences in standard behavior and appearance between the different versions. The screen captures in this application were created on a personal computer running Windows 2000®.

The Namespace Item

Figure 9:
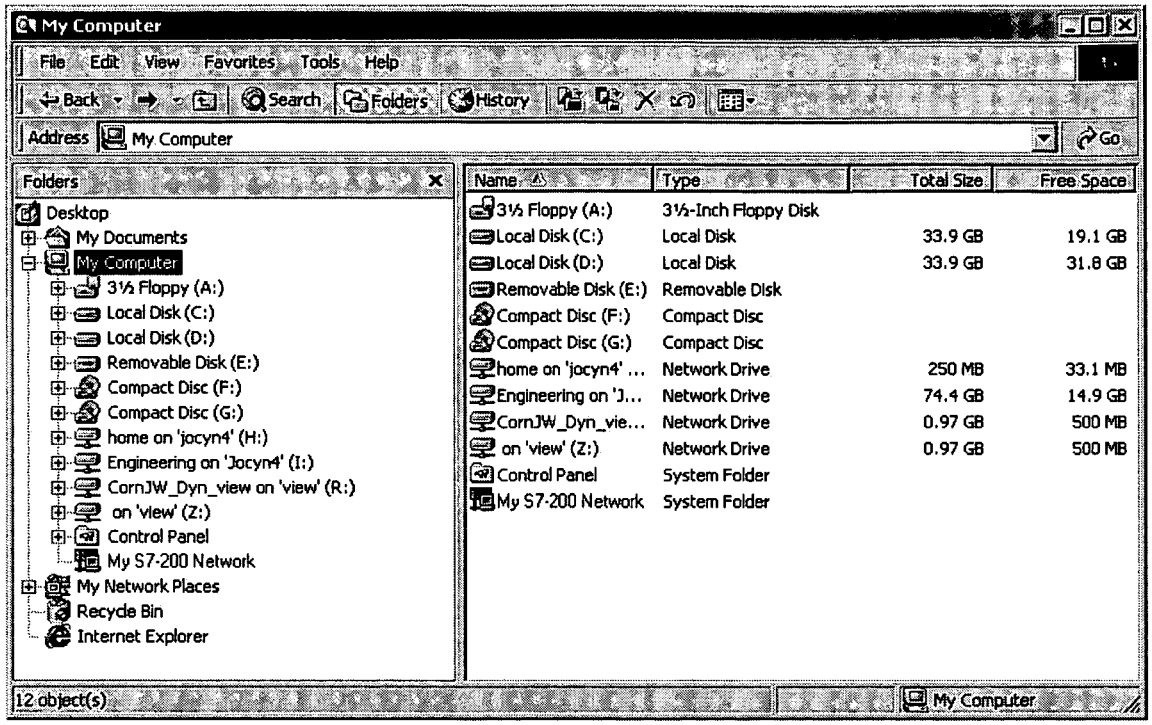

When the namespace is accessed, My S7-200 Network can appear as a node. It might or might not appear as the root item in the interface, depending on the method used to launch the namespace. FIG. 9 shows the appearance of an exemplary embodiment of a namespace when launched as part of the "My Computer" namespace in Windows Explorer. Note that the act of launching the namespace as a part of My Computer does not necessarily cause the namespace to be "explored". Therefore the My S7-200 Network item can appear as a node.

Context Menu

In certain exemplary embodiments, when the user selects the My S7-200 Network item and clicks the right mouse button, a context menu can be displayed showing available options. What follows is a description of certain exemplary embodiments of each menu option, what it does, and the rules governing its availability.

Expand/Collapse—This can be the default option supplied by Windows XP® for all namespace items. It causes the contents of the selected item to be displayed in the right-hand pane of the Explorer view or collapsed into a tree node.

Explore—This opens a new Explorer window. The Folder view can be the same, but the item can be expanded in the right-hand view of this new Explorer window.

Open—This menu item can display the contents of the PLC item in a separate Explorer view, without the left-hand Folder view.

Modem Connect—This menu item can only appear when the user's current communications settings specify a modem connection. This menu item can launch the Modem Connection dialog. Note that this menu item can appear as "Modem Disconnect . . . " if the modem connection is currently active. Selecting this menu choice can cause a refresh of the namespace.

Modem Setup—This menu item can appear when the user's current communications settings specify a modem connection. This menu item can launch the Modem Setup dialog. Selecting this menu choice can cause a refresh of the namespace.

PG/PC Interface—This menu choice can be visible for the namespace item. It launches the PG/PC Interface dialog. Selecting this menu choice can cause a refresh of the namespace.

Add IP Address—This menu choice can appear when the user's current communications settings specify Ethernet communications. This menu item can launch the IP Address Browser dialog. Selecting this menu choice can cause a refresh of the namespace.

Create Shortcut—This menu choice can be used to create a Windows shortcut to the namespace item. This shortcut can by default be placed on the desktop.

Properties—This menu choice displays the property sheet for the namespace item. This is described in more detail in the following section.

Help—This menu choice can launch help for the S7-200 Explorer.

Namespace Properties

Figure 10:
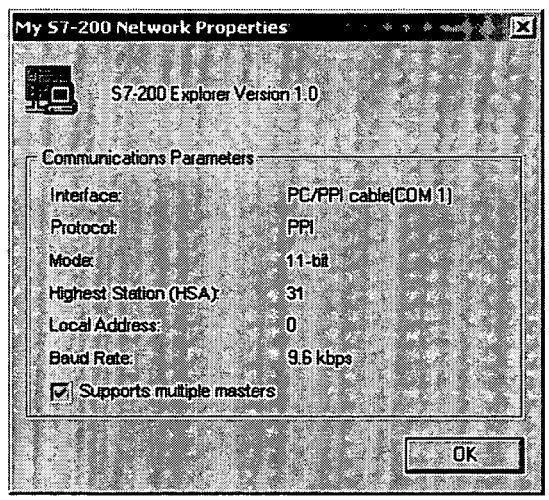

When the user selects "Properties" from the context menu for the namespace item, the properties dialog of FIG. 10 can be displayed. This properties dialog contains the product version and a read-only display of the current communications parameters. This display can be modeled after the information displayed in the STEP 7-Micro/WIN Communications dialog. The information shown above can be appropriate for a PPI connection. Other types of connections (e.g., Ethernet) can show slightly different information.

Double Click Support

The behavior of the double mouse click on the namespace item can be the same as selecting "Expand" from the context menu.

Expanding the Namespace Contents

Figure 11:
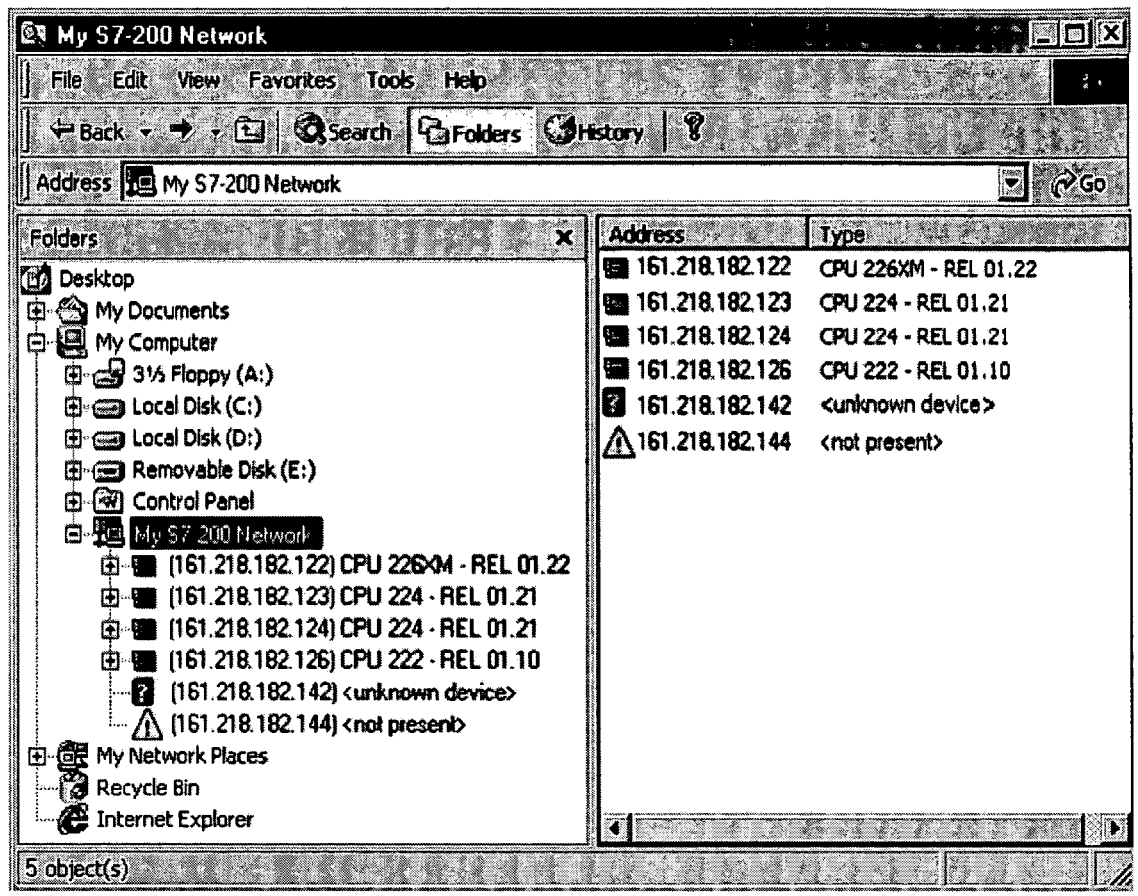

Whenever the namespace is refreshed (either explicitly by selecting Refresh from the Windows Explorer main menu, or implicitly by selecting a context menu choice), the contents of My S7-200 Network can be determined by activating the communications interface currently selected by the user. The resulting view can be very similar to the network life list displayed in the STEP 7-Micro/WIN "Communications" dialog. The screen capture of FIG. 11 shows an example S7-200 network with all the possible types of items detected.

The My S7-200 Network can be now displayed as a folder containing an item for each device on the network. The items in the My S7-200 Network folder can be ordered by network address. When the user has Ethernet communications selected, the addresses can appear as such. FIG. 11 illustrates an example S7-200 Ethernet network.

No matter what the network type, the devices on the network can be listed in order of network address. There can be four distinct categories of items that can be listed in the namespace. The following sections detail the functionality of each.

PLC Items

Figure 12:
Figure 12:
Figure 12:
Figure 12:
Figure 12:
Figure 12:
Figure 12:

S7-200 PLCs on the network can appear as items in the namespace folder. The label for each PLC in the folder view (the left-hand pane of the Explorer interface) can comprise the network address (either Profibus or Ethernet) in parenthesis followed by the PLC model and firmware revision, read from the PLC. Specific icons can be provided for each PLC type. Note that the 16×16 (small) icons can be all the same for all PLC types. FIG. 12 lists the possible PLC icons (32×32 pixel version) that can appear in the namespace, and their associated PLC types. The PLC item can appear with or without the expansion indicator (the "+" sign). The expansion indicator can be present if the PLC has an attached Gen 3 memory cartridge.

Context Menu

Right clicking on a PLC item (in either the left or right pane of the explorer view) can display a context menu of available options. What follows are descriptions of each potential menu option, what it does, and the rules governing its availability.

Expand/Collapse—This can be the default option supplied by Windows XP® for all namespace items. It causes the contents of the selected item to be displayed in the right-hand pane of the Explorer view.

Explore—This opens a new Explorer window. The Folder view can be the same, but the item can be expanded in the right-hand view of this new Explorer window.

Open—This menu item can display the contents of the PLC item in a separate Explorer view, without the left-hand Folder view.

Modem Connect—This menu item can appear when the user's current communications settings specify a modem connection. This menu item can launch the Modem Connection dialog. Note that this menu item can appear as "Modem Disconnect . . . " if the modem connection is currently active. Selecting this menu choice can cause a refresh of the namespace.

Modem Setup—This menu item can appear when the user's current communications settings specify a modem connection. This menu item can launch the Modem Setup dialog. Selecting this menu choice can cause a refresh of the namespace.

PG/PC Interface—This menu choice can always be visible for the namespace item. It launches the PG/PC Interface dialog. Selecting this menu choice can cause a refresh of the namespace.

Add IP Address—This menu choice can appear when the user's current communications settings specify Ethernet communications. This menu item can launch the IP Address Browser dialog. Selecting this menu choice can cause a refresh of the namespace.

Create Shortcut—This menu choice can be used to create a Windows shortcut directly to the PLC item. This shortcut can by default be placed on the desktop.

Help—This menu choice can launch help for the S7-200 Explorer.

TD 200 Items

When the user has PPI communications selected, TD 200 devices (firmware version 2.01 and later) attached to the network can appear in the namespace.

Context Menu

The context menu for TD 200 items can be the same as is displayed for PLC items. Note that TD 200 devices typically only appear in the namespace when a non-Ethernet communications option is selected, so the "Add IP Address . . . " choice need not appear in the context menu for a TD 200 item.

Also, no additional information typically is available for TD 200 items, so nothing typically is gained by using the Expand, Explore, or Open context menu choices. These menu choices can still perform in the expected manner (as you would expect for an empty folder in Windows Explorer), but no additional information can be displayed.

Unknown Items

When a device responds to a poll of its address, but does not answer a request to read SD0, the device can be displayed as an "unknown" item in the namespace. This might include S7-300 PLCs, Operator panels, or TD 200 devices older that version 2.01. However, since the device did not answer the SD0 read request, no type or version information typically is available for the device.

Context Menu

The context menu for Unknown items can be the same as is displayed for PLC items. Unknown items can appear for any communications option, so the menus options described earlier can apply.

As with the TD 200 device, no additional information is typically available for Unknown items, so nothing is necessarily gained by using the Expand, Explore, or Open context menu choices. These menu choices can still perform in the expected manner (as you would expect for an empty folder in Windows Explorer), but no additional information typically would be displayed.

Not Present Items

When the user is communicating through an Ethernet interface, the network typically is not polled to determine present devices. Rather, the user typically configures the addresses they wish to see (using the IP Address Browser dialog in either STEP 7-Micro/WIN or available from context menus in the namespace). If the user configures a network address for which no device is found, the address can be displayed as a "<not present>"node. This can mimic what occurs in the STEP 7-Micro/WIN communications dialog for the same situation.

Context Menu

The context menu for 'Not Present' items can be the same as is displayed for PLC items.

No additional information is typically available for 'Not Present' items, so nothing typically is gained by using the Expand, Explore, or Open context menu choices. These menu choices can still perform in the expected manner (as you would expect for an empty folder in Windows Explorer), but no additional information need be displayed.

PLC Block Items

Figure 13:
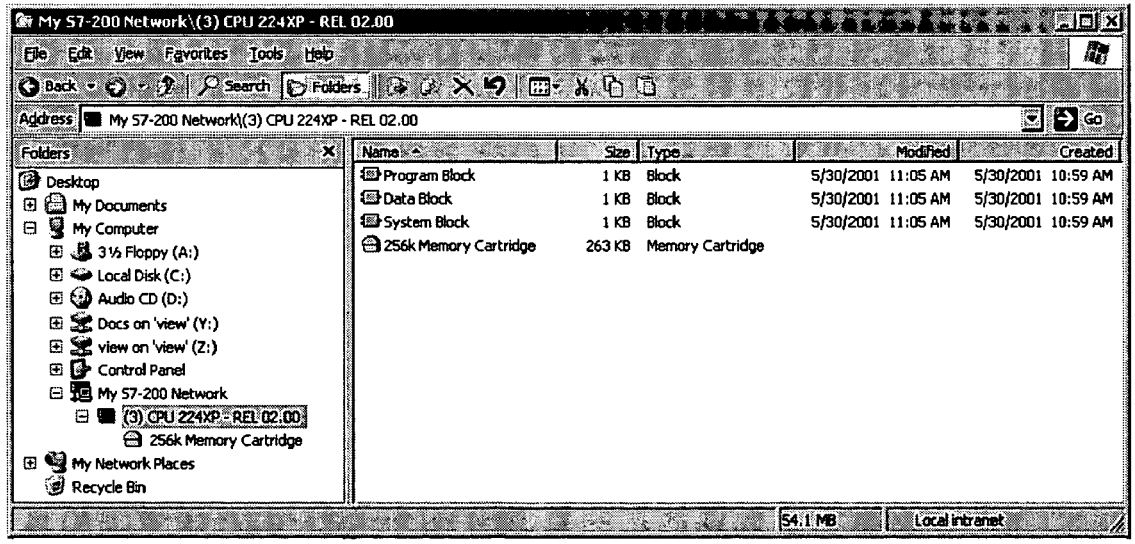

PLC Items can be expanded to view the block contents of the PLC device. This information can be displayed in the following ways:

Single clicking or double clicking the left mouse button on the PLC Block Item can cause the contents of the PLC device to be listed in the right pane of the explorer view. FIG. 13 illustrates this.

Selecting the context menu choice Explore can produce the same display of information, but can launch a new Explorer window for the display. The existing Explorer view can be unaffected.

Figure 14:
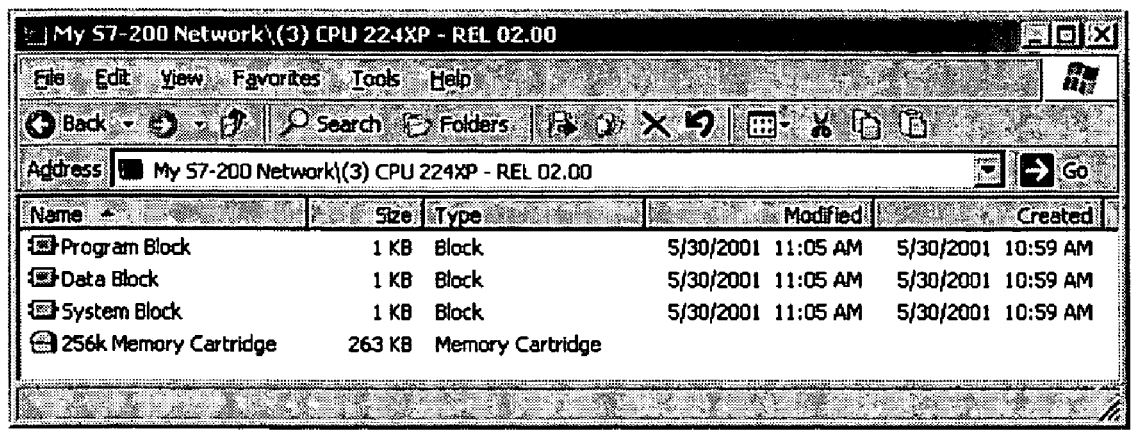

Selecting the context menu choice Open can also open a new Explorer view, but display the information without the Folder view, as illustrated in FIG. 14.

A PLC can contain the following items:

| Item Name | Rules | Information Available | Description |
| --- | --- | --- | --- |
| 256K Memory Cartridge | Present only if the PLC has an attached 256 KB Gen 3 cartridge. | Size | The total amount of used that exists (used + available) on the cartridge |

-continued

| Item Name | Rules | Information Available | Description |
|---|---|---|---|
| 64K Memory Cartridge | Present only if the PLC has an attached 64 KB Gen 3 cartridge. | Size | The total amount of used that exists (used + available) on the cartridge |
| Program Block | Present only if the PLC has an OB1 block. This block might or might not be present | Size Modified Created | The total size OB1 The modified timestamp for OB1 The created timestamp for OB1 |
| Data Block | Present only if the PLC has a DB1 block. This block might or might not be present | Size Modified Created | The total size of DB1 The modified timestamp for DB1 The created timestamp for DB1 |
| Sytem Block | The PLC always has a System Block. Depending on the situation, this can be SDB0 or SDB2 | Size Modified Created | The total size of the SDB The modified timestamp for the SDB The created timestamp for the SDB |

Any items present can be listed in the order above.

Context Menu

Figure 15:
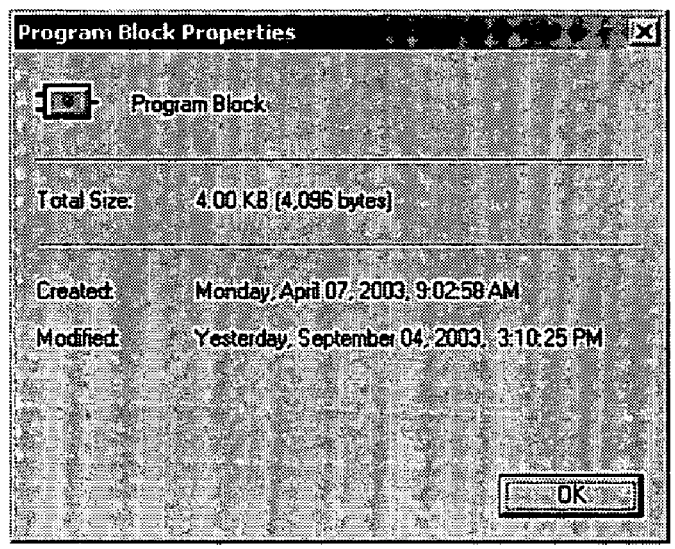

The context menu for PLC Block items contains a single choice for "Properties". Double-clicking on the PLC Block item can also launch the properties dialog. Properties Dialog When the user selects "Properties" from the context menu for a PLC Block item, the properties dialog shown in FIG. 15 can be displayed. Note that the various sizes in the screen capture are for example purposes only. For an actual block, the Total Size field can represent the sum of the Header size, Area 1 size and Area 3 size.

This properties dialog can have the following features:

The Title of the dialog can be the name of the PLC block item plus 'Properties'

The top area of the dialog can repeat the PLC block name, and display the icon used for PLC blocks in STEP 7-Micro/WIN.

The Total size field can display the size of the block on the PLC. Note that this can be the total size of the block, not just the Area 1 size.

The Created field can be the created time for the PLC block. This date and time can be formatted in the same manner as timestamps within the Windows file properties sheet.

The Modified field can be the modified time for the PLC block. This date and time can be formatted in the same manner as timestamps within the Windows file properties sheet.

Gen 3 Memory Cartridge Items

If a PLC device on the network has an installed Gen 3 memory cartridge, then the PLC item can be displayed with the expansion indicator (+). Clicking the expansion indicator can update the left-hand "Folders" pane to show the Gen 3 memory cartridge. This action does not affect the right-hand pane of the Explorer view.

Context Menu

The 256K-memory cartridge item can display the following in its context menu.

Expand—This can be the default option supplied by Windows XP® for all namespace folder items. In the case of the memory cartridge this can be disabled because there are no subfolder objects underneath it to expand to.

Explore—This opens a new Explorer window. The Folder view can be the same, but the item can be expanded in the right-hand view of this new Explorer window.

Open—This menu item can display the contents of the PLC item in a separate Explorer view, without the left-hand Folder view.

Clear All—This menu choice allows the user to clear the contents of the Gen 3 memory cartridge. Since this can be a destructive action and typically is not un-doable, the user can be asked to confirm this choice.

Create Shortcut—This menu choice can be used to create a Windows shortcut directly to the Gen 3 memory cartridge item. This shortcut can by default be placed on the desktop.

Properties—This menu choice can open the properties dialog for the memory cartridge.

Help—This menu choice can launch help for the S7-200 Explorer.

Figure 16:
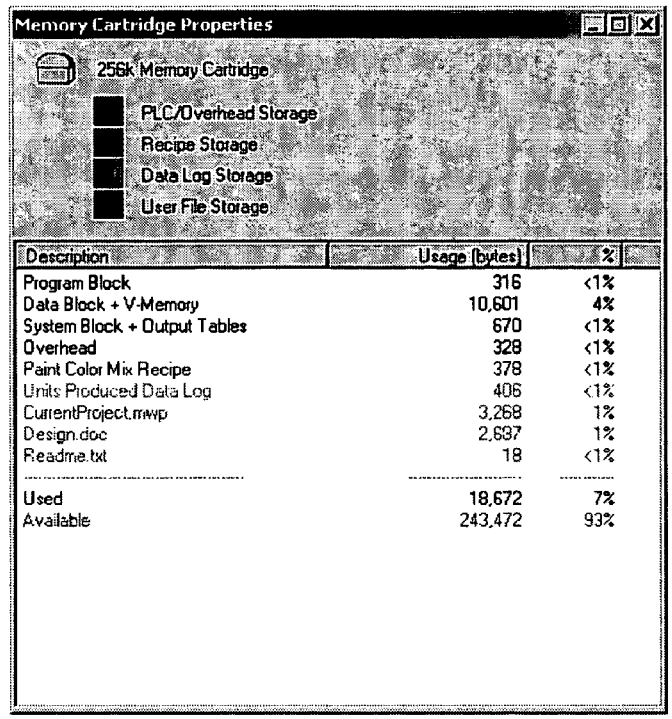

The Memory Cartridge Properties, shown in the screen capture of FIG. 16, can indicate the contents of the memory cartridge along with the current distribution in both bytes and percent of total memory cartridge space. The items can be color coded and sorted by type. Percentages less than 1% can be represented by <1% symbol. The percents might not add up exactly to 100% because of rounding calculations. User and Available can always total 100%. Byte sizes listed above the line can always total the "Used" value and the "Used" value plus the "Available" value can always total the total memory cartridge size.

Program Block—Total size of Program Block stored in the MC.

Data Block+V-Memory—Total size of V Memory image which the PLCs can store anytime a Data Block is copied to the MC. Data Block and V-Memory image can overlap and size typically is always V-Memory of the PLC that programmed the cartridge+Data Block Area 3 & header.

System Block+Output Tables—Total size of System block plus 300+bytes taken up by the output tables.

PLC/Overhead—Primarily GPB overhead+a little of the PLC data overhead.

Recipes—Each recipe can be listed individually by user defined wizard name.

Data Logs—Each Data Log can be listed individually by user defined wizard name.

User Files—Each user file stored on the memory cartridge can be shown individually. The size can be the actual compression size used.

Expanding a Memory Cartridge Item

Figure 17:
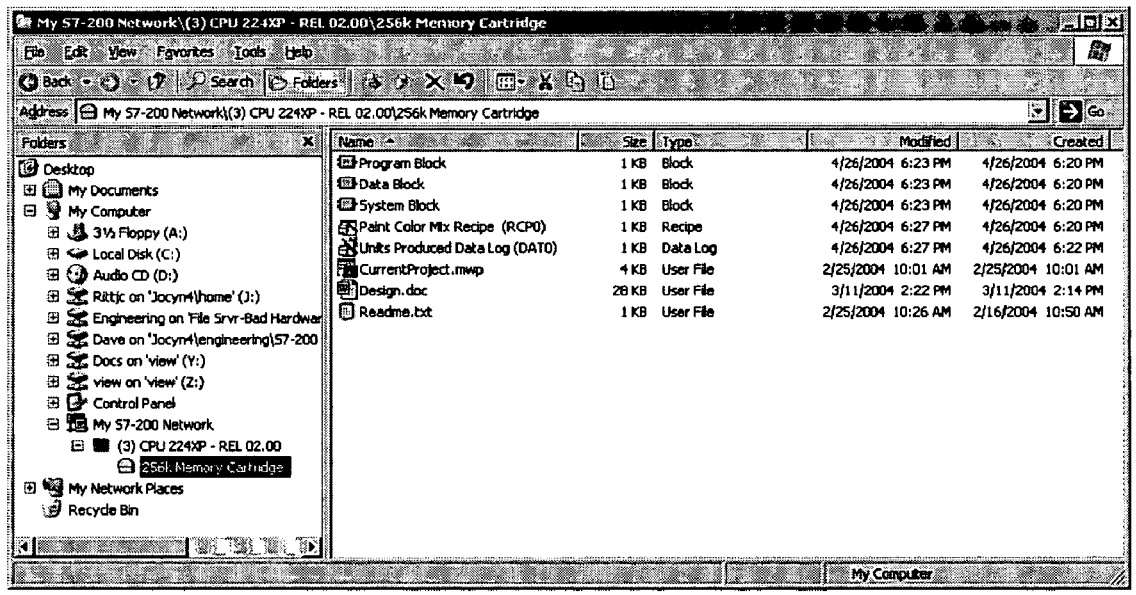
Figure 18:
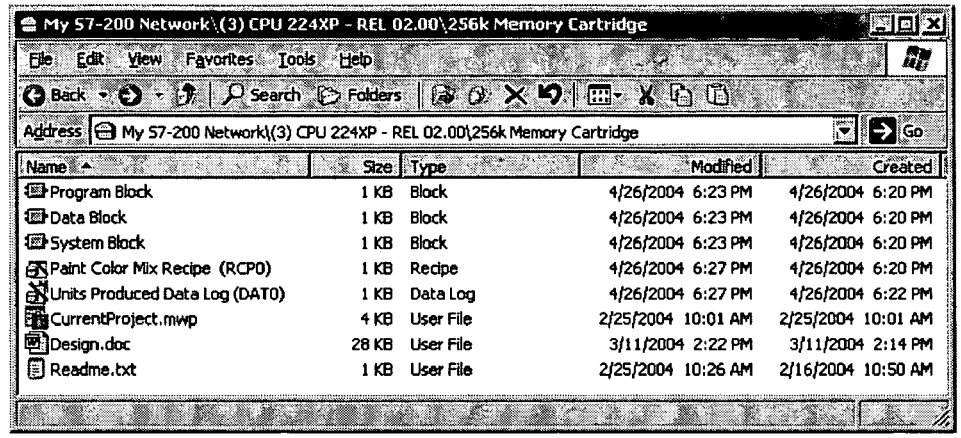

The memory cartridge item can be a folder much like the PLC item. The contents of the memory cartridge item can be displayed in the following ways:

- Single clicking or double clicking the left mouse button on the Gen 3 memory cartridge Item can cause the contents of the memory cartridge device to be listed in the right pane of the explorer view. The screen capture of FIG. 17 illustrates this.
- Selecting the context menu choice Explore can produce the same display of information, but can launch a new Explorer window for the display. The existing Explorer view can be unaffected.
- Selecting the context menu choice Open can also open a new Explorer view, but display the information without the hierarchical Folder view, as illustrated in FIG. 18.

Expanded Memory Cartridge Contents

Once the Gen 3 memory cartridge item has been expanded, the following items can be listed:

Memory Cartridge contents can be listed in the order of the above table. Specific ordering within item groups are covered in the following sections.

PLC Block Items

The PLC Block items listed in the Gen 3 memory cartridge (Program Block, Data Block, System Block) typically support no additional functionality and typically cannot be expanded or opened. The context menu provided for PLC Block items can contain a "Properties" option. Double-clicking the left mouse button on a PLC Block item can also launch the properties dialog.

Properties Dialog

When the user selects "Properties" from the context menu for a PLC block item, the same properties dialog can be displayed as detailed in the PLC Block section earlier.

Recipe Items

The Gen 3 memory cartridge item can contain (0-4) recipe items, each of which corresponds to a STEP 7-Micro/WIN wizard configuration. Recipe configurations present on the MC can be listed individually, ordered by their recipe number.

| Item Name | Rules | Information Available | Description |
|---|---|---|---|
| Program Block | Present only if the MC has been programmed with OB1 from the PLC. This block might or might not be present | Size | The size of the entire OB1 in the MC |
|  |  | Modified | The modified timestamp for OB1 |
|  |  | Created | The created timestamp for OB1 |
| Data Block | Present only if the MC has been programmed DB1 from the PLC. This block might or might not be present. | Size | The size of the entire DB1 in the MC |
|  |  | Modified | The modified timestamp for DB1 |
|  |  | Created | The created timestamp for DB1 |
| System Block | Present only if the MC has been programmed with SDB0 from the PLC. This block might or might not be present. | Size | The size of the entire SDB in the MC |
|  |  | Modified | The modified timestamp for SDB |
|  |  | Created | The created timestamp for SDB |
| Recipes (see description below) | The MC can contain 0 to 4 recipe configurations. Each recipe configuration can be listed separately. | Size | The size of recipe configuration on the MC |
|  |  | Modified | The modified timestamp for the recipe configuration. |
|  |  | Created | The created timestamp for the recipe configuration. |
| Data Logs (see description below) | The MC can contain 0 to 4 data log configurations. Each data log configuration can be listed separately. | Size | The size of data log configuration on the MC |
|  |  | Modified | The modified timestamp for the recipe configuration. |
|  |  | Created | The created timestamp for the recipe configuration. |
| Files (see description below) | The MC can contain 0 or more data files. Each data file on the MC can be listed separately. Stored files can be compressed if they save at least one byte of data otherwise they can be stored uncompressed. | Size | The compressed size of the file. |
|  |  | Modified | The modified timestamp for the file. |
|  |  | Created | The created timestamp for the file. |

It can be noted that recipe configurations can be created either with the recipe wizard or the TD 200 wizard in STEP 7-Micro/WIN.

- The Icon displayed for recipe items can be the same icon used in the recipe wizard in STEP 7-Micro/WIN.
- The Name for a recipe item can be the name the user assigned to the wizard configuration in STEP 7-Micro/WIN. Appended to this name in parenthesis can be the recipe number, in the form "(RCP x)" where "x" can be 0 to 4.
- The Size for a recipe item can be the total amount of memory cartridge space occupied by the recipe.
- The Modified time for a recipe item can be the last time the wizard configuration was edited in STEP 7-Micro/WIN. Note that this does not represent the download time.
- The Created time for a recipe item can be the time when the wizard configuration was created in STEP 7-Micro/WIN.

Figure 19:
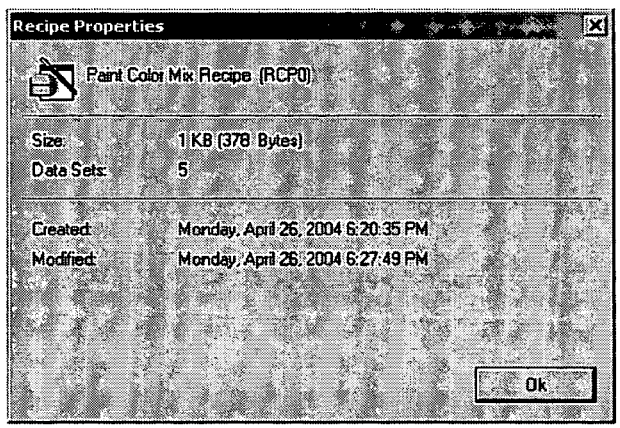

Recipe items support no additional functionality and cannot be expanded or opened. The context menu provided for Recipe items can contain a "Properties" option. Double-clicking the left mouse button on a Recipe item can also launch the properties dialog Properties Dialog When the user selects "Properties" from the context menu for a recipe item, the properties dialog of FIG. 19 can be displayed.

This properties dialog can have the following features:
- The Title of the dialog can be the name of the recipe item plus 'Properties'
- The top area of the dialog can repeat the recipe item name, and display the icon used for the recipe wizard in STEP 7-Micro/WIN.
- The size field can display the size of the recipe configuration in the memory cartridge.
- The Data Sets field can display the number of recipe data sets associated with this recipe configuration.
- The Created field can be the created time for the recipe configuration. This date and time can be formatted in the same manner as timestamps within the Windows file properties sheet.
- The Modified field can be the modified time for the recipe configuration. This date and time can be formatted in the same manner as timestamps within the Windows file properties sheet.

Data Log Items

The Gen 3 memory cartridge item can contain (0-4) data log items, each of which corresponds to a STEP 7-Micro/WIN data log wizard configuration. Data log configurations present on the MC can be listed individually, ordered by their data log number.
- The Icon displayed for data log items can be the same icon used in the data log wizard in STEP 7-Micro/WIN.
- The Name for a data log item can be the name the user assigned to the data log wizard configuration in STEP 7-Micro/WIN. Appended to this name in parenthesis can be the data log number, in the form "(DAT x)" where "x" can be 0 to 4.
- The Size for a data log item can be the total amount of memory cartridge space occupied by the data log.
- The Modified time for a data log item can be the last time the data log wizard configuration was edited in STEP 7-Micro/WIN. Note that this does not represent the download time.
- The Created time for a data log item can be the time when the data log wizard configuration was created in STEP 7-Micro/WIN.

Context Menu

Data Log items can display the following in their context menu:
- Upload—This menu choice can allow the user to upload the logged data for this item from the memory cartridge. This is discussed in greater detail below. Double-clicking the item with the left mouse button can have the same affect.
- Open File on Upload—This menu choice can toggle the selection shown. When checked this indicated when the user upload from the namespace, the uploaded CSV file can be opened with the currently registered CSV file editor (normally Excel). If not checked, the Data Log can still be uploaded but the editor need not be opened. If run from a short cut, this selection can have no effect and the CSV editor is not opened and any error received can be written to the CSV file rather than displayed since the users might not be present (see Shortcuts & Automated Uploads).
- Create Shortcut—This menu choice can create a shortcut to the upload of the Data Log and place it on the user's desktop.
- Properties—This menu choice can display the properties dialog for the Data Log item, as discussed below.

Data Log Shortcuts & Automated Uploads

The user can leverage the Scheduler that comes with Windows to execute automated uploads of any or all Data Logs. When used with the Clear on Upload feature set in the wizard, this becomes a powerful data gathering feature that creates CSV files that can be read by automated programs such as Excel or Access to track critical items for the user such as sales and billing. The user can set the scheduler up to run and can restart the computer without logging in and the Scheduler can automatically start and log in the user under the Scheduled account.

To create a scheduled task, the user typically does the following steps:
1) Create a shortcut to the Data Log to be uploaded at a regular interval.
2) Drag and drop the Data Log shortcut into the Scheduled Tasks folder found as a subfolder under Control Panel in Windows Explorer.
3) Double click the shortcut and set the times and frequencies that the upload is to execute.
4) Set the login and password for the user account in which the scheduled task is to run (if the machine is networked).

Figure 20:
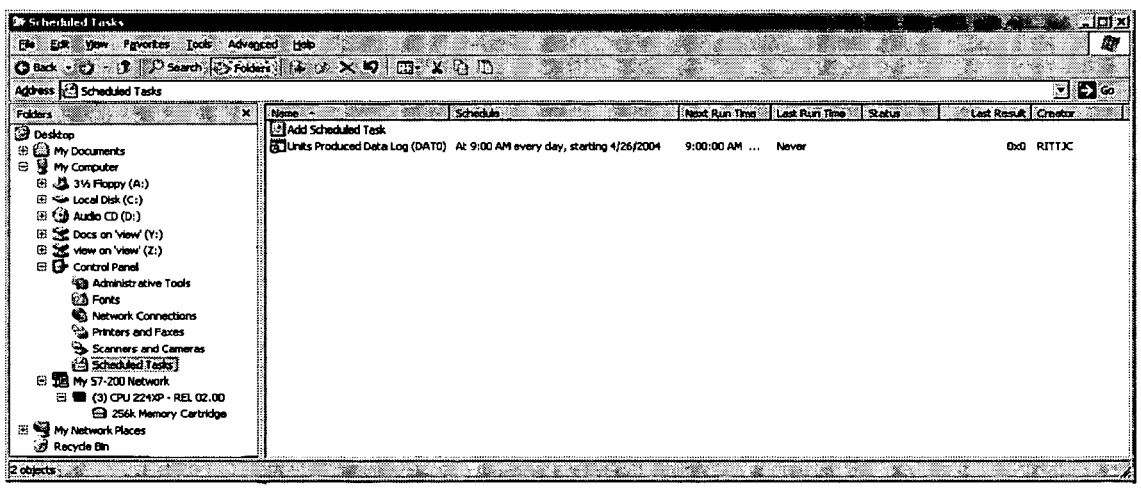

FIG. 20 shows the result of Step 2.

Figure 21:
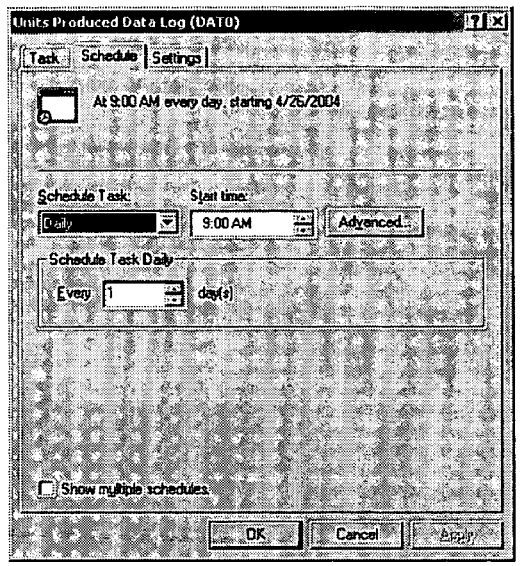

FIG. 21 illustrates a Windows XP dialog that can allow the user to schedule start and end dates as well as frequency of execution of scheduled tasks. This is Step 3

Figure 22:
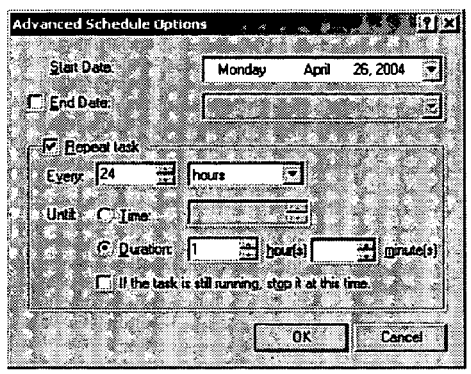

FIG. 22 shows a Windows XP dialog that can allow the user to schedule when and how often the task (upload of the Data Log) is to be executed.

Figure 23:
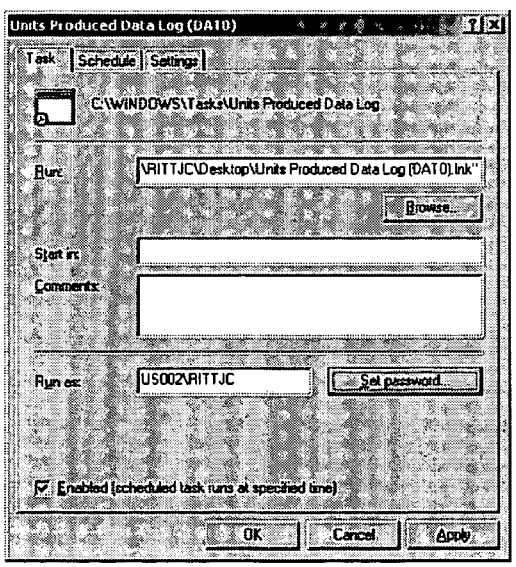

FIG. 23 shows a Windows XP dialog that can allow the user to configure the user name and password to run. This is Step 4 and typically is only necessary if the user has configured a login account for users on the machine connected to the network.

When the Scheduled Task is properly configured, then the S7-200 explorer can be silently started and the Data Log(s) can be uploaded at the configured intervals even if the user is in the process of using the machine already or whether the user had rebooted the machine to run automatically. The uploaded CSV files can be sent to the following path: C:\Program Files\Siemens\Microsystems\Data Logs\

The CSV files can have the following naming convention: "(PLC_ADDRESS)-USER_DEFINED_DATA_LOG_NAME—DATE—TIME.CSV"

Note that the Colons ":" and slashes "/" can be removed from the date and time because they typically are not allowed in Windows file names.

Figure 24:
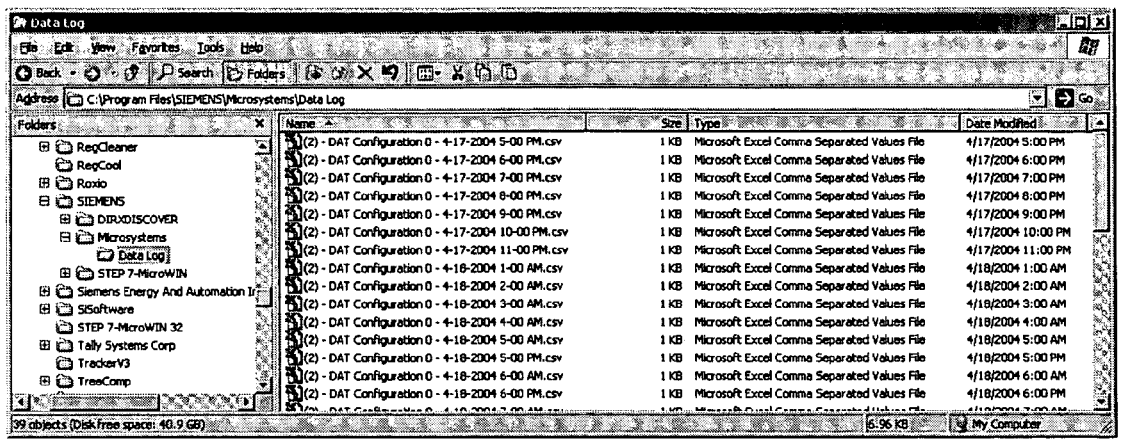

The example of FIG. 24 illustrates a Data Log that was configured to run once an hour from 5:00 April 17 to the end of April 18$^{th}$ every hour on the hour. Any of these files can be read by double clicking them or reading them in an automated fashion using Excel, Access or any other data base that read CSV files.

Properties Dialog

Figure 25:
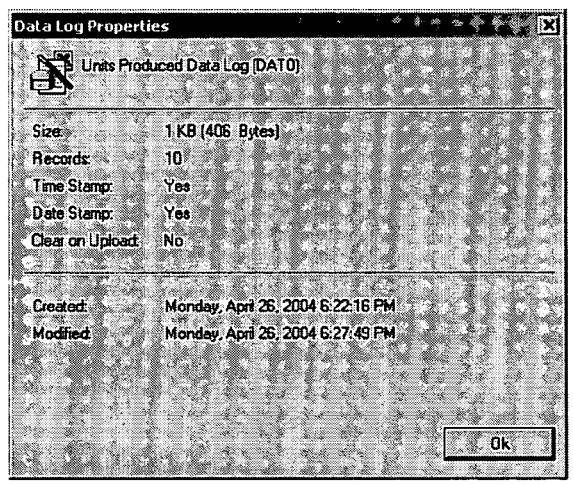

When the user selects "Properties" from the context menu for a data log item, the properties dialog of FIG. 25 can be displayed, which can have the following features:

- The Title of the dialog can be the name of the data log item plus 'Properties'
- The top area of the dialog can repeat the data log item name, and display the icon used for the data log wizard in STEP 7-Micro/WIN.
- The size field can display the size of the data log configuration in the memory cartridge.
- The Records field can display the number of logged data records associated with this data log configuration in the memory cartridge.
- The Time stamp field can indicate either Yes or No. This can be an option the user has previously configured in the data log wizard in STEP 7-Micro/WIN.
- The Date stamp field can indicate either Yes or No. This can be an option the user has previously configured in the data log wizard in STEP 7-Micro/WIN.
- The Clear on upload field can indicate either Yes or No. This can be an option the user has previously configured in the data log wizard in STEP 7-Micro/WIN.
- The Created field can be the created time for the data log configuration. This date and time can be formatted in the same manner as timestamps within the Windows file properties sheet.
- The Modified field can be the modified time for the data log configuration. This date and time can be formatted in the same manner as timestamps within the Windows file properties sheet.

Data Log Shortcut

A Data Log can have a shortcut item created on the desktop. The user can move this shortcut where as desired and can call the shortcut from a Windows script file, drag it to the Scheduled Tasks folder to run at scheduled intervals, or double click it using explorer. Executing the shortcut (no matter what method used) can attempt to upload the Data Log and output it in a .CSV file in the Data Log folder. Executing from a shortcut can be considered non-interactive and need not show the user errors but can write the errors to the .CSV file.

Uploading Logged Data

Selecting 'Upload' from the context menu, double clicking on a data log item from within S7-200 Explorer, or double clicking/running a Data Log shortcut can cause the logged data records to be uploaded and converted to Comma Separated Values (CSV) format. The logged data can be stored in the C:\Program Files\Siemens\Microsystems\Data Logs folder using the naming convention of the PLC address inside parenthesis (whether PPI address or Ethernet address followed by a hyphen, followed by the user defined wizard name followed by another hyphen followed by the DATE in the current culture of Windows set by the current language setting shared by Microwin, followed by a hyphen followed by the TIME in the culture of Windows followed by the .csv (Comma Separated Values) extension. Note that slashes ("/") and colons (":") can be removed and replaced with hyphens because they cannot be used in Windows file naming conventions.

The user can select to open the file on upload. This action implies interactive operation, so this means that it applies only to the right-mouse-click or double-click from within S7-200 Explorer itself NOT from any shortcut even if the user double clicks a shortcut. This is because S7-200 explorer can detect if the upload operation was started from the shortcut but cannot determine if it was started from an automation task such as Scheduled Task execution or from a batch file or VB/Java script file.

The user can select to "Open File on Upload" from the right context menu. If the item is checked (selecting it toggles the check) and the user uploads from the S7200 Explorer directly (not from a shortcut), then the namespace explorer can look to see if a CSV file association exists. If no application is associated with ".csv" then the user can be displayed a message showing this fact but the upload executed with the CSV file going to the Data Log folder as described above.

File Items

The Gen 3 memory cartridge item can contain any number of file items, limited only by the space available on the cartridge. Each file item present on the MC can be listed individually, in alphabetical order.

- The Icon displayed for file items can be the icon registered for use with the file's type (extension) with the operating system. Note that this can vary from user to user.
- The Name for a file item can be the file name plus its file extension. Note that these can be always displayed together. The Windows setting to "hide extensions for known file types" need not have an affect on this display.
- The Size for a file item can be the compressed file size. Note that this can be different than the actual file size.
- The Modified time for a file item can be the modified time for the file. Note that this does not represent the time the file was placed on the memory cartridge.
- The Created time for a file item can be the creation time for the file. Note that this does not represent the time the file was placed on the memory cartridge.

Context Menu

File items can display the following in their context menu:

- Paste—This menu choice typically is only enabled when there is a file on the Windows® clipboard. This choice writes the file on the clipboard to the MC. The user can also use the Ctrl+V key combination when a file item has focus to achieve this functionality.
- Delete—Removes the file from the memory cartridge. Since this can be a destructive action and typically is not undoable, the user can be asked to confirm this action. The user can also use the DEL key when a file item has focus to achieve this functionality.
- Properties—Displays the properties dialog for the file.

Drag and Drop Support

The namespace can support drag and drop of files with the Gen 3 memory cartridge item. The user can drag files from the Gen 3 memory cartridge item and drop them into a directory on their hard drive, or onto the desktop. Likewise, dropping a file onto the Gen 3 memory cartridge can cause it to be stored in the memory cartridge (if there is space available). File items can be the only items in the My S7-200 Network namespace that support drag and drop. The namespace can support the "drag-copy" operation, in which dragging the item makes a copy. The namespace need not support "drag-move" in which dragging the item removes it from its original location.

File Items with Duplicate Names

When the user attempts to place a duplicate file item on the Gen 3 memory cartridge, the operation can overwrite the existing file item. Since this can be a destructive action that typically is not undoable, the user can be asked to confirm the operation. This applied to Pasting items, and 'Dropping' items on the Gen 3 memory cartridge.

Properties Dialog

Figure 26:
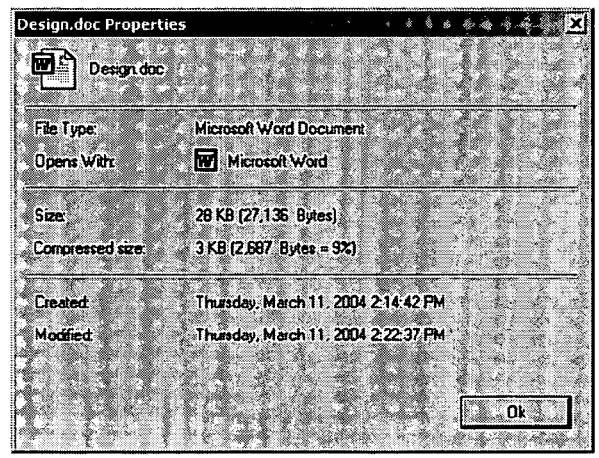

When the user selects "Properties" from the context menu for a File item, the properties dialog of FIG. 26 can be displayed. This dialog can be modeled after the File Properties dialog provided with Windows. This properties dialog can have the following features:

- The Title of the dialog can be the name of the file item plus 'Properties'
- The top area of the dialog can repeat the file item name, and display the icon registered with the operating system for that type of file (as determined by the file's extension). Note that this icon can differ between user systems.
- The Type of file field can display the registered file type for the file item. This string comes from the registry and can differ between user systems.
- The Opens with field can display the application (with icon) that is registered for the given file type. Again, this comes from the registry and can differ between user systems.
- The size field can display the actual file size. Note that this can differ from the size displayed for the file item in the memory cartridge.
- The Compressed size field can display the size of the file item on the memory cartridge. File items can be compressed to save space on the memory cartridge. This size can match what is displayed in the Explorer view for the file item. The percent shown can be the percent of the original file size that the file is compressed to. If compression does not save at least one byte, then the file can be stored uncompressed and compression size can indicate that the file is not compressed.
- The Created field can be the created time for the file. This date and time can be formatted in the same manner as timestamps within the Windows file properties sheet.
- The Modified field can be the modified time for the file. This date and time can be formatted in the same manner as timestamps within the Windows file properties sheet.

Folder View Options

Windows supports different views for items in a namespace. The My S7-200 Network namespace can support the following view options:

- Large Icons—The namespace items can display 32×32 icons. The label for PLC items can be the network address for the PLC. All other namespace items can display their name as the label.
- Small Icons—The namespace items can display 16×16 icons with the item. The items can display the same label as for the Large Icons option.
- List—The namespace items can be displayed in a vertical list. PLC items can display their 16×16 icon and network address. All other items can display their 16×16 icon and their name.
- Details—All the screen captures in this document illustrate the 'Details' view. The section for each type of namespace item documents the information displayed in the 'Details' view.

Sorting

Windows normally provides sorting on each column of information in the 'Details' view. Sorting can show the files sorted ascending starting with all "Blocks" followed by all Recipes, followed by all Data Logs, followed by user files. The files can be sub-sorted alphabetically. Clicking on the column headers can cause sorting by that column. Clicking on it again can cause a descending order sort.

Refreshing the Namespace Contents

Refreshing the namespace can cause communications to become active and the contents of the network to be determined. Note that any time the namespace is refreshed its contents can change, making the currently selected item invalid. When this occurs, the current selection to revert to the namespace item. Refreshing the namespace might also result in an error. When an error is encountered refreshing the namespace, then all items can be cleared, an error message displayed (discussed below), and selection can revert to the namespace item.

Some actions within the namespace view can cause additional information to become visible, but might not necessarily refresh the view. For instance, if the user has already refreshed the view (gathered information about all the active devices on the network), they can contract/expand a tree item (by clicking the "+" or "−" indicator associated with the icon) without causing another refresh. This action can simply redraw the information, not re-gather it. As a general statement, the namespace can follow the standard set by the 'My Computer' namespace with regards to when data is refreshes versus merely redrawn.

Error Handling

Figure 27:
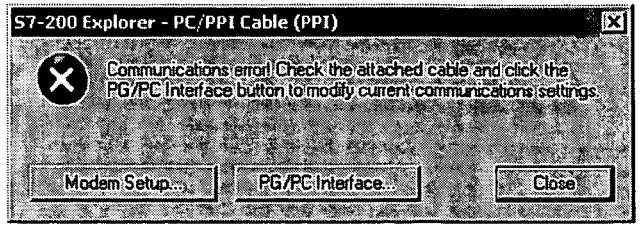

Whenever an error occurs executing a user request, an error dialog can be displayed with a specific error message and links to possible solutions. The title of the error dialog can include the current communications interface. The Close button can always appear on the dialog. The other buttons on the dialog might or might not be visible, depending on the specific error and the user's current communications settings. The screen capture of FIG. 27 shows an example of the error dialog with all buttons visible.

- The PG/PC Interface . . . button can be visible when the error is communications related.
- The Modem Setup . . . button can be visible when the error is communications related, and the user has modem communications selected.
- The Close button can be visible, possibly at all times.

Possible Error Conditions

Any communications error possible in STEP 7-Micro/WIN can also be possible from the S7-200 Explorer. The text displayed for these errors can match those displayed from STEP 7-Micro/WIN.

Some errors specific to Gen 3 memory cartridge operations also can be possible. See the GPB spec for additional error information possible for GPB operations such as insufficient room for the operation.

A specific error can be possible when the user has created a desktop shortcut to a namespace item (PLC or Gen 3 memory cartridge). When the user selects the shortcut, this item might no longer be present on the network. In this situation a specific error message can be displayed.

Desktop Shortcuts

Installing the S7-200 Explorer can place a desktop shortcut to the My S7-200 Network namespace, as discussed earlier. The user also can have the option to create a desktop shortcut directly to a PLC item, Data Log item and a Gen 3 Memory Cartridge item. When the user creates a desktop shortcut, the icon used for the shortcut can match the icon of the item in the namespace. The text for the shortcut can also match the text for the item in the namespace.

When the user selects one of these desktop shortcuts, the namespace item that the shortcut represents can be launched in its own Explorer view. The resulting display can be identical to what would result if the user selected the 'Open' context menu choice for the item in the full namespace view with the exception of Data Logs where an upload of the Data Log occurs but Explorer is not opened.

Whenever a desktop shortcut to a namespace item is launched, communications can be activated to "refresh" the S7-200 network. This can result in an error if either communications cannot be established, or if the item the shortcut represents is no longer present on the network. In either of these situations, an error dialog can result, with a message specific to the error condition. See the error handling section for more information.

Note that when the user removes S7-200 Explorer from their machine by an un-installation, only those desktop shortcuts provided by the installation are typically removed. Any desktop shortcuts the user has created need not be removed. These shortcuts likely will no longer function, and the error that results from attempting to launch the shortcut can be determined by Windows.

Multiple Instances of My S7-200 Network

Since the 'My S7-200 Network' namespace integrates with Windows Explorer, any time the user launches an instance of Windows Explorer, an instance of the namespace can be launched as well. Multiple instances of My S7200 Network can exhibit the same communications behavior/limitations as two instances of STEP 7-Micro/WIN and can be addressed by the out of proc server used by Microsystems programs.

GPB

GPB refers to the "General Purpose Block" which contains memory cartridge directory information in area 1 as well as compressed user files in area 3 (if any). S7-200 Explorer uses the IGPB200 interface if available to query contents of the memory cartridge quickly. If not available it typically polls the individual blocks and uploads the headers to determine the sizes. Either way the S7-200 Explorer typically operates identically with or without the presence of a GPB. The design details of the GPB and IGPB200 can be found in the document VOB under DocumentCtrl\S7-200\Programming Tools\Engineering Documents\Theories of Operation\General Purpose Block.doc Users Guide Browsing the S7-200 Network The S7-200 Explorer can integrate with Microsoft Windows Explorer to allow browsing of a PPI or Ethernet network. After installing the S7-200 Explorer application you can have a new node in your Windows Explorer called "My S7-200 Network". If you have STEP 7-Micro/WIN v4.0 loaded on your computer, you already have the S7-200 Explorer application, no further installation is necessary.

Browsing a PPI Network

Figure 28:
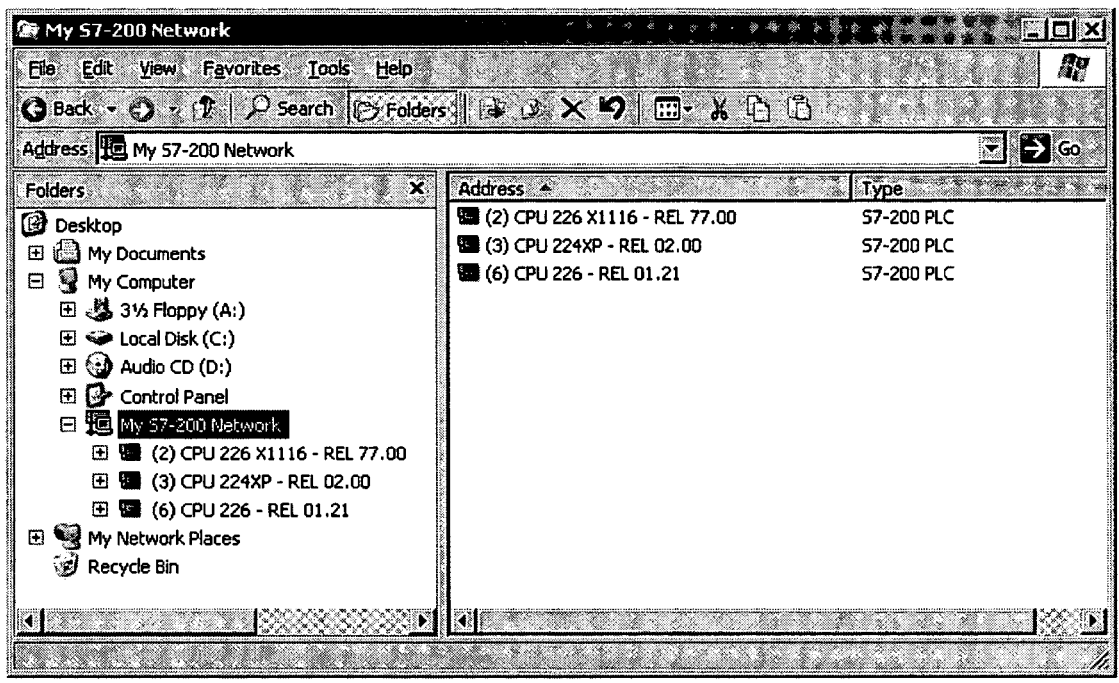

Double-click on the node "My S7-200 Network" and Windows Explorer can browse the PPI network showing a list of attached devices. All possible network addresses can be polled for attached devices. When a device is found it can be identified and displayed, as shown in FIG. 28. The network address assigned to each device is listed in parenthesis.

Tip: If devices are attached or removed from the PPI network use the F5 key at any time to refresh the list.

Tip: Not all PLCs and memory cartridges support the functionality of the S7-200 Explorer. Please refer to the S7-200 System Manual for a complete list of hardware features and options.

Browsing an Ethernet Network

Figure 29:
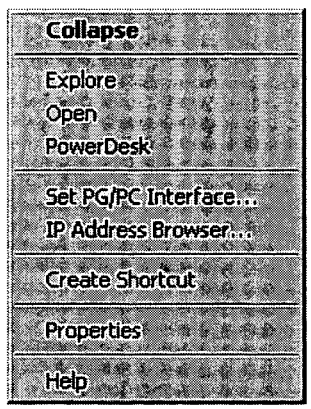

Double-click on the node "My S7-200 Network" and Windows Explorer can show a list of pre-configured IP addresses and the status of the attached device. In an Ethernet network, IP addresses are typically configured rather than determined automatically. To configure IP addresses use the IP Address Browser application. You can access this application by using the corresponding right mouse menu item from the node "My S7-200 Network", as shown in FIG. 29.

Note: Please refer to the STEP 7-Micro/WIN help system for more information on setting up Industrial Ethernet networks using the S7-200 Ethernet and Internet modules.

Communication Settings

The S7-200 Explorer shares the following communication parameters with your STEP 7-Micro/WIN programming software:

Access Point (example Micro/WIN->PC/PPI Cable)

Local Address

Transmission Rate (Baud Rate)

Port

Other Network Parameters

To change communication settings use the Set PG/PC Interface application. You can access this application by using the corresponding right mouse menu item from the node "My S7-200 Network".

Note: Please refer to the STEP 7-Micro/WIN help system for more information on setting up PPI or Industrial Ethernet networks.

Using Modems

If your communication settings can be set to use a modem connection then you can establish the modem connection prior to browsing the S7-200 network. To establish a connection use the Connect Modem application. You can access this application by using the corresponding right mouse menu item from the node "My S7-200 Network", as shown in FIG. 30.

After a modem connection is established you can browse the S7-200 network. Double-click on the node "My S7-200 Network" and Windows Explorer can show the list of attached devices. All possible network addresses can be polled for attached devices. When a device is found it can be identified and displayed. The network address assigned to each device is listed in parenthesis.

REMEMBER TO DISCONNECT! When you are finished using the S7-200 Explorer you must manually disconnect to terminate the modem connection. Closing the Windows Explorer need not disconnect your modem. To disconnect use the corresponding right mouse menu item from the node "My S7-200 Network", as shown in FIG. 31.

Browsing the S7-200 PLC

Double-click on any S7-200 PLC to browse the contents of the PLC. The PLC can contain any of the following:

| | |
|---|---|
| Program Block | (item) |
| Data Block | (item) |
| System Block | (item) |
| Memory Cartridge | (folder) |

In the Windows Explorer only folders are typically listed in the Left pane. A memory cartridge can contain additional items, therefore it can be a folder. Only the memory cartridge can be listed in the left pane, since it can be the only folder.

Both folders and items can be listed in the Right pane of the Windows Explorer, as shown in FIG. 32.

Browsing the Memory Cartridge

Double-click on the Memory Cartridge to browse the contents of the cartridge. The Memory Cartridge can contain any of the following:

| | |
|---|---|
| Program Block | (item) |
| Data Block | (item) |
| System Block | (item) |
| Recipe Configuration(s) | (up to 4 items) |
| Data Log(s) | (up to 4 items) |
| User File(s) | (items) |

Figures 33, 34:
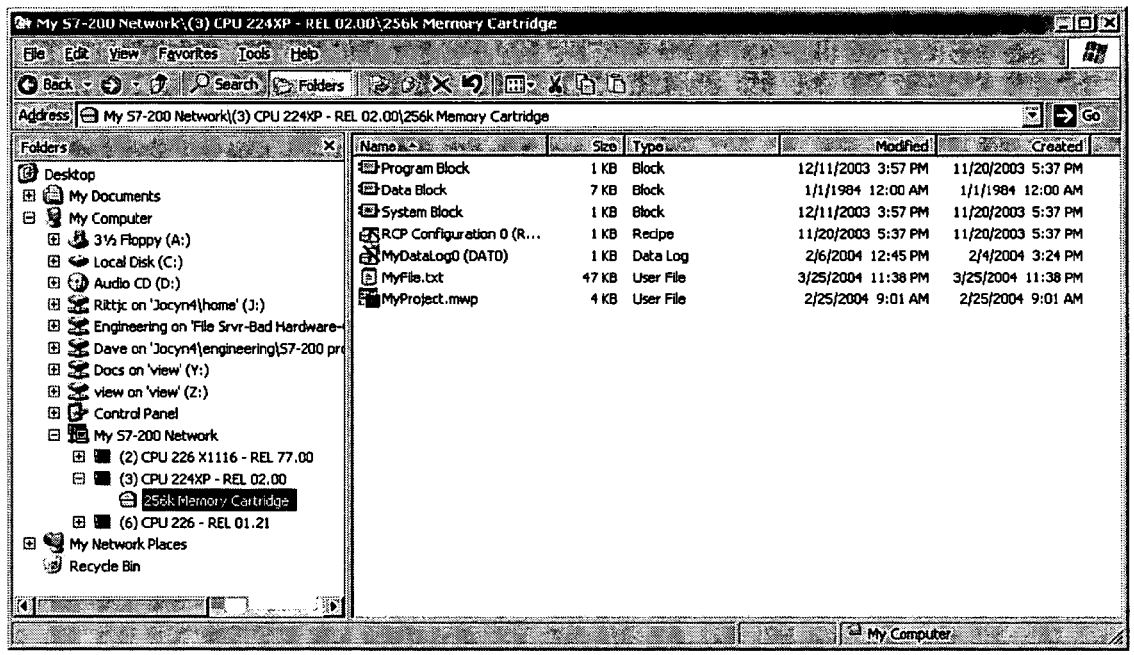

In the Windows Explorer only folders typically are listed in the Left pane. There are typically no folders on a memory cartridge, therefore all of the above items can be listed in the Right pane of the Windows Explorer, as shown in FIG. 33.

Retrieving Data Log Values

To retrieve Data Log values from the memory cartridge double-click on a Data Log node. The data can be uploaded from the memory cartridge and formatted as a .csv file (comma separated values file). The file can then be opened by the application you have associated with .csv file extensions. Typically this application can be Microsoft Excel.

Note: You must have an application associated with .csv file extensions before the Data Log values can be uploaded.

Note: If you set the wizard option to clear the Data Log values on Upload, you must make sure you save the data. Use the associated application, Microsoft Excel, and save your data to a directory and filename you are familiar with.

The screen shot shown in FIG. 34 is an example of Data Log values uploaded into Excel. After double-clicking on the Data Log node from the Windows Explorer the values can be uploaded and opened in Excel.

Tip: It is recommended that you immediately perform a Save As function to save the data to a directory and filename that you are familiar with.

Adding User Files

You can use the free space of a memory cartridge to store your STEP 7-Micro/WIN project file or any other files you wish. The files can be compressed as they are dragged and dropped onto the memory cartridge node by the S7-200 Explorer. You do not have to use a separate compression utility such as WinZip. If a file is already compressed a second compression typically is not performed. You can view the properties of any file you put on the memory cartridge by using the right mouse menu item "Properties".

To add a file to the memory cartridge simply drag and drop the file onto the memory cartridge folder. You can also use the right mouse menu items copy and paste.

Memory Cartridge Properties

Figure 35:
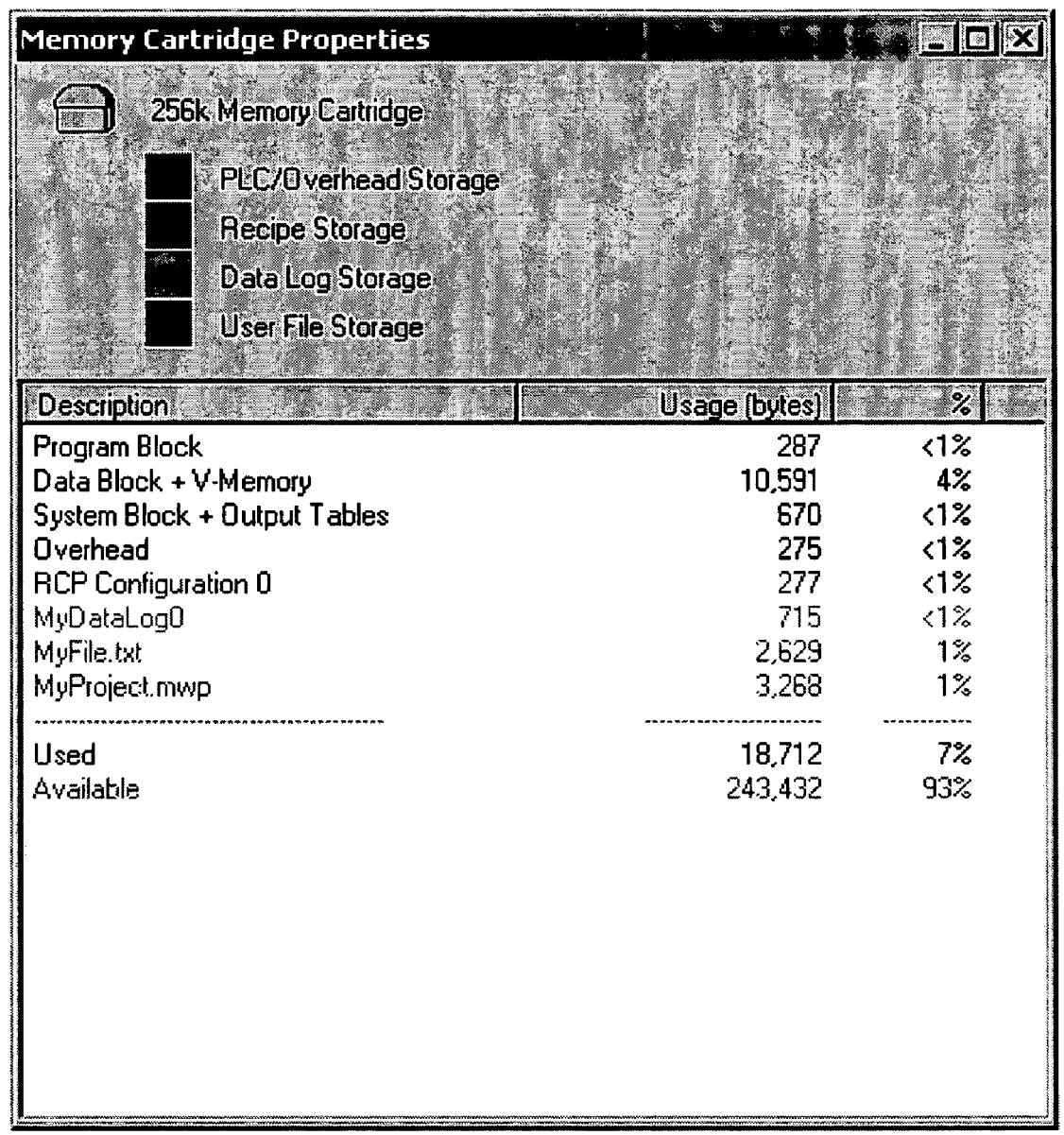

The right mouse menu item Properties displays the screen shown in FIG. 35.

You can use this screen to quickly summarize the used and free space available on the memory cartridge.

Clearing the Memory Cartridge

The right mouse menu item Clear, on a Memory Cartridge node, can allow you to erase all items.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method, comprising:
   via a PLC network interface of a non-PLC information device:
   presenting, to the non-PLC information device, a PLC network as a namespace shell extension of a running operating system of the non-PLC information device, wherein the PLC network is one of a Profibus network and a Point to Point Interface network;
   receiving at least one search parameter at the PLC network interface of the non-PLC information device, said at least one search parameter specified by a user of the non-PLC information device;
   searching, in response to receiving said at least one search parameter, the PLC network for at least one item corresponding to said at least one search parameter specified by a said user of the non-PLC information device;
   rendering to the user of the non-PLC information device said at least one item corresponding to said at least one search parameter wherein at least a portion of said at least one item is identified as conforming to said at least one search parameter; and rendering said at least one item in an order based on a rank of the at least one item;

wherein the non-PLC information device is adapted to poll all possible network addresses of the PLC network to identify PLC devices coupled to the PLC network.

2. The method of claim 1, further comprising:
via the PLC network interface, receiving the at least one search parameter, the at least one search parameter adapted for use by the non-PLC information device to search for files on one of the Profibus network and the Point to Point Interface network.

3. The method of claim 1, further comprising:
via the PLC network interface, identifying the at least one item corresponding to the at least one search parameter specified by the user, the at least one item a file on one of the Profibus network and the Point to Point Interface network.

4. The method of claim 1, further comprising:
via the PLC network interface, rendering the at least one item corresponding to the at least one search parameter specified by the user.

5. The method of claim 1, further comprising:
via the PLC network interface, highlighting the at least one item corresponding to the at least one search parameter specified by the user.

6. The method of claim 1, further comprising:
via the PLC network interface, previewing the at least one item corresponding to the at least one search parameter specified by the user.

7. The method of claim 1, wherein the at least one item comprises a file stored on a memory device connected to a PLC connected to the PLC network.

8. The method of claim 1, wherein the at least one item comprises a content of a file stored on a memory device connected to a PLC connected to the PLC network.

9. The method of claim 1, wherein the at least one search parameter comprises a property of the item.

10. The method of claim 1, wherein the at least one search parameter comprises at least a portion of a file name.

11. The method of claim 1, wherein the at least one search parameter comprises a file type.

12. The method of claim 1, wherein the at least one search parameter comprises file creation temporal information.

13. The method of claim 1, wherein the at least one search parameter comprises file modification temporal information.

14. The method of claim 1, wherein the at least one search parameter comprises a file storage location.

15. The method of claim 1, wherein the at least one search parameter comprises a file size.

16. The method of claim 1, wherein the at least one search parameter comprises a textual content of the item.

17. The method of claim 1, wherein the at least one search parameter comprises a graphical content of the item.

18. The method of claim 1, wherein the at least one search parameter comprises an image content of the item.

19. The method of claim 1, wherein the at least one search parameter comprises an audio content of the item.

20. The method of claim 1, wherein the at least one search parameter comprises a video content of the item.

21. The method of claim 1, wherein the at least one search parameter comprises an animation content of the item.

22. The method of claim 1, wherein:
the at least one item is a portable configuration of a PLC, the portable configuration adapted to configure a device for use on a central processor unit of the PLC.

23. The method of claim 1, wherein:
the at least one item is PLC control source file.

24. The method of claim 1, wherein:
the at least one item is a programmable logic controller memory cartridge.

25. A machine-readable memory storing a plurality of instructions for activities comprising:
via a PLC network interface of a non-PLC information device:
presenting, to the non-PLC information device, a PLC network as a namespace shell extension of a running operating system of the non-PLC information device, wherein the PLC network is one of a Profibus network and a Point to Point Interface network;
receiving at least one search parameter at the PLC network interface of the non-PLC information device, said at least one search parameter specified by a user of the non-PLC information device;
searching, in response to receiving said at least one search parameter, the PLC network for at least one item corresponding to said at least one search parameter, relating to a criteria, specified by said user of the non-PLC information device;
rendering to the user of the non-PLC information device said at least one item corresponding to said at least one search parameter wherein at least a portion of said at least one item is identified as conforming to said at least one search parameter; and
rendering said at least one item in an order based on a rank of the at least one item;
wherein the non-PLC information device is adapted to poll all possible network addresses of the PLC network to identify PLC devices coupled to the PLC network.

26. A method, comprising:
via a programmable logic controller (PLC) network interface of a non-PLC information device, receiving at least one search parameter at the PLC network interface of the non-PLC information device, said at least one search parameter specified by a user of the non-PLC information device; searching, in response to receiving said at least one search parameter, a Profibus network for at least one item corresponding to said at least one search parameter specified by said user of the non-PLC information device, the non-PLC information device adapted to present the Profibus network as a namespace shell extension of a running system of the non-PLC information device; rendering to the user of the non-PLC information device said at least one item corresponding to said at least one search parameter wherein at least a portion of said at least one item is identified as conforming to said at least one search parameter; and rendering said at least one item in an order based on a rank of the at least one item;
wherein the non-PLC information device is adapted to poll all possible network addresses of the Profibus network to identify PLC devices coupled to the Profibus network.

* * * * *